United States Patent [19]

Rucker

[11] Patent Number: 5,158,046
[45] Date of Patent: Oct. 27, 1992

[54] TWO-STROKE CYCLE ENGINE HAVING LINEAR GEAR DRIVE

[76] Inventor: Richard D. Rucker, 5010 W. New World Dr., Glendale, Ariz. 85302

[21] Appl. No.: 769,782

[22] Filed: Oct. 2, 1991

[51] Int. Cl.$^5$ ............................................. F02B 75/02
[52] U.S. Cl. .................................. 123/65 R; 123/197.4
[58] Field of Search ............. 123/65 R, 65 A, 65 VC, 123/65 S, 74 AE, 197.4

[56] References Cited

U.S. PATENT DOCUMENTS

| | | |
|---|---|---|
| 587,380 | 8/1897 | Ziegler . |
| 1,056,746 | 3/1913 | Pitts . |
| 1,090,647 | 3/1914 | Pitts . |
| 1,579,083 | 3/1926 | Collins . |
| 1,789,190 | 1/1931 | Noble ................. 123/65 S |
| 1,834,651 | 12/1931 | Schlupmann ............ 123/65 S |
| 2,465,116 | 3/1949 | Petersen ............ 123/74 AE |
| 2,886,976 | 5/1959 | Dean . |
| 2,938,506 | 5/1960 | Buchi ............... 123/74 AE |
| 3,175,544 | 3/1965 | Hughes . |
| 3,258,992 | 7/1966 | Hittell . |
| 3,277,743 | 10/1966 | Kell . |
| 3,329,134 | 7/1967 | Llewellyn . |
| 3,563,223 | 2/1971 | Ishida ................ 123/192 B |
| 3,693,464 | 9/1972 | Weickmann ............ 123/197.4 |
| 3,744,342 | 7/1973 | Kinoshita ............ 123/192 B |
| 3,791,227 | 2/1974 | Cherry ................... 74/52 |
| 3,861,239 | 1/1975 | McWhorter ............. 123/197.4 |
| 3,886,805 | 6/1975 | Koderman ................. 74/52 |
| 4,026,252 | 5/1977 | Wrin .................. 123/197.4 |
| 4,078,439 | 3/1978 | Iturringa-Notarlo ........ 74/53 |
| 4,173,151 | 11/1979 | Grundy .................... 74/49 |
| 4,237,741 | 12/1980 | Huf et al. ................. 74/52 |
| 5,067,456 | 11/1991 | Beachley et al. ......... 123/197.4 |

FOREIGN PATENT DOCUMENTS 1006204 4/1957 Fed. Rep. of Germany .... 123/65 S

*Primary Examiner*—David A. Okonsky
*Attorney, Agent, or Firm*—H. Gordon Shields

[57] ABSTRACT

A balanced motor two-stroke cycle engine having a linear drive includes a sealed gearcase secured to a cylinder housing having a plurality of concentric cylinders. The sealed gearcase includes a fixed ring gear, a pinion gear whose diameter is equal to the radius of the ring gear, a hub on which a piston rod is journaled for rotation, and two sets of counterweights. The piston rod moves in a linear fashion as the pinion gear rotates inside the fixed ring gear. The piston rod extends into the innermost cylinder, and a piston secured to the piston rod reciprocates linearly in the innermost cylinder. Different embodiments of exhaust valve structure are illustrated in different embodiments, and an external combustion chamber embodiment is also illustrated.

36 Claims, 7 Drawing Sheets

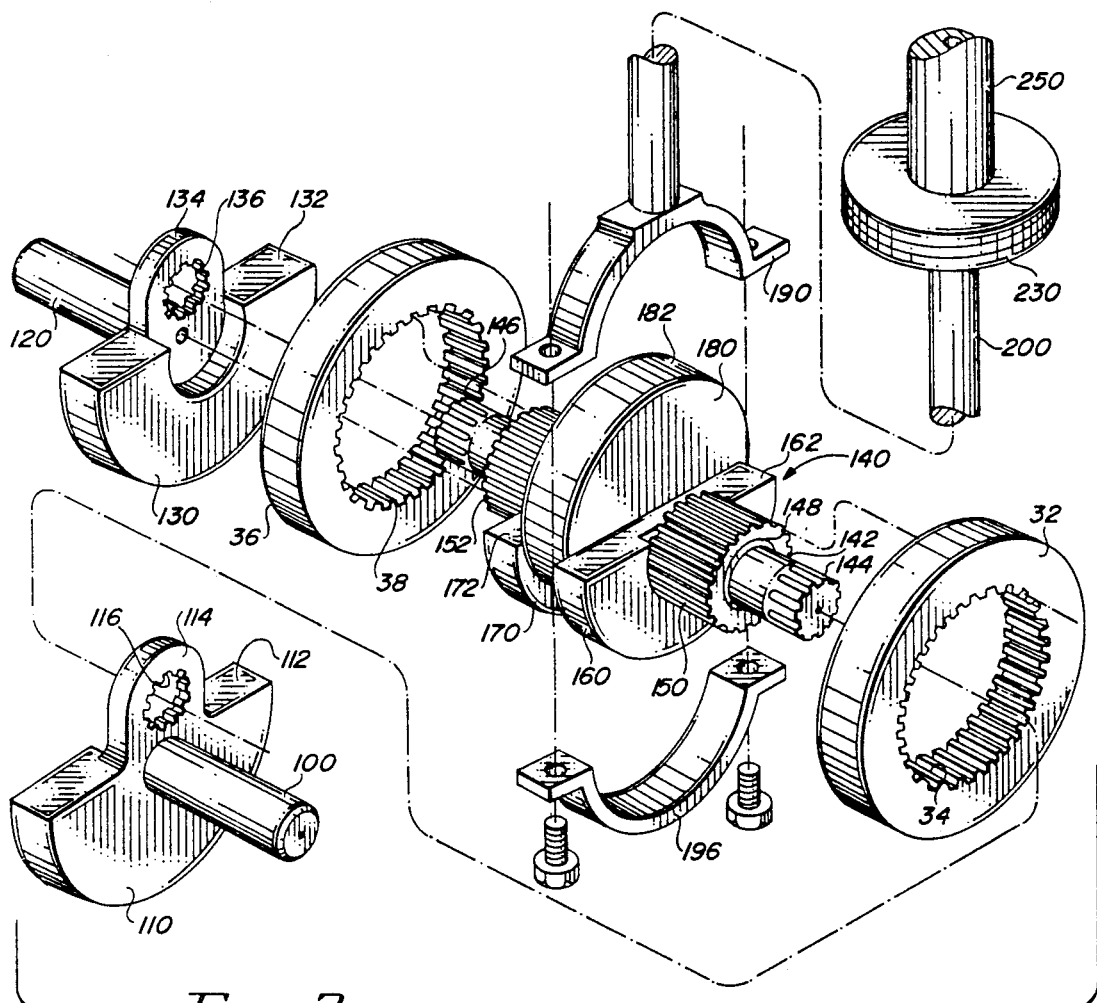
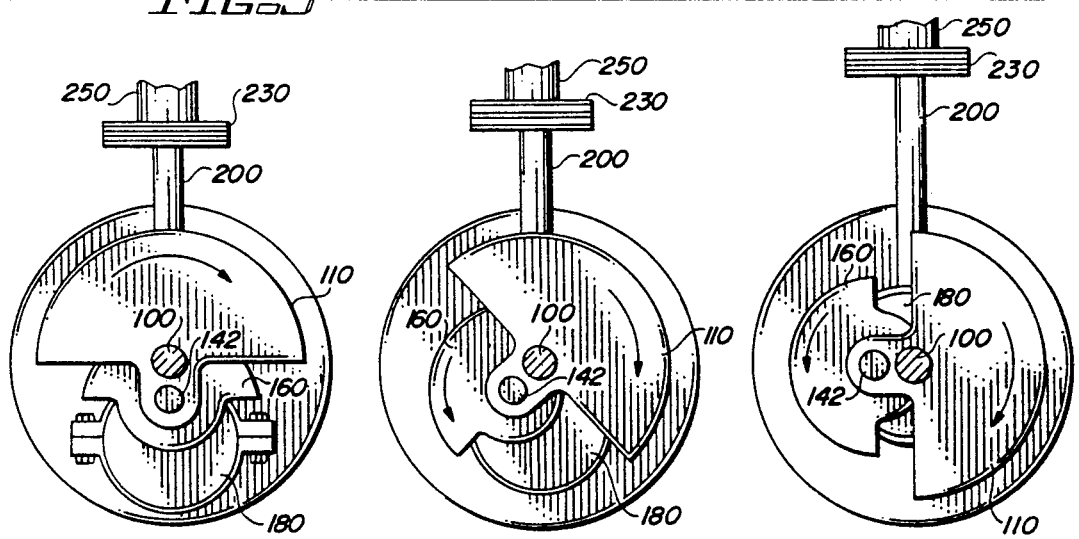
FIG.-3
FIG.-4A   FIG.-4B   FIG.-4C

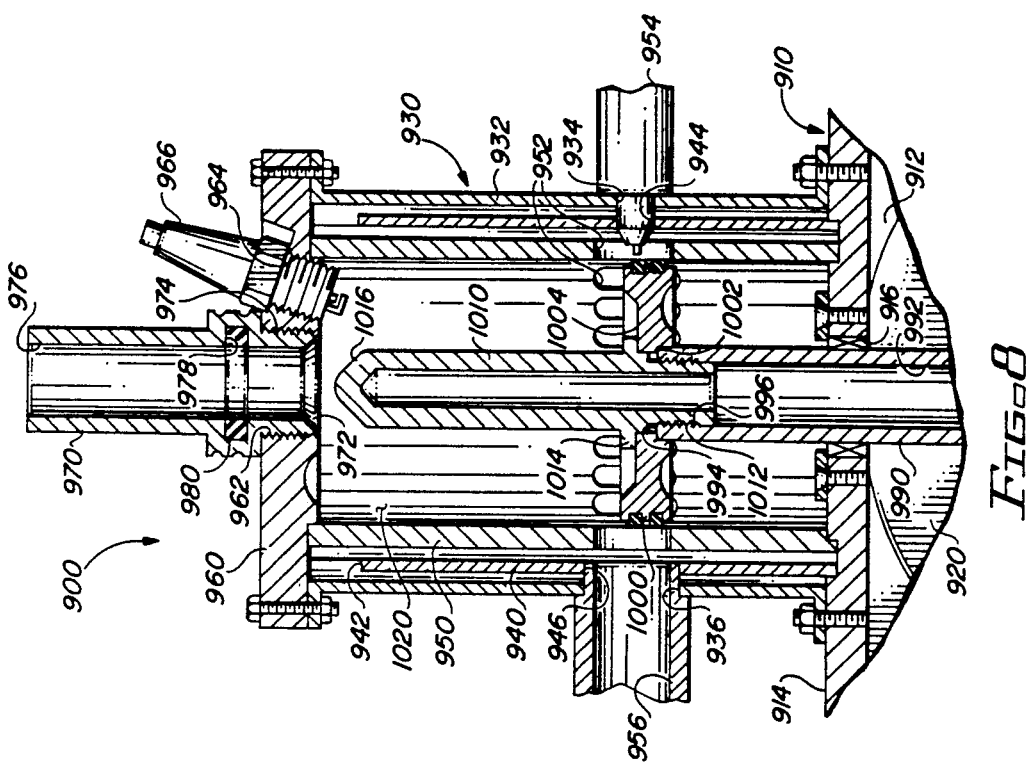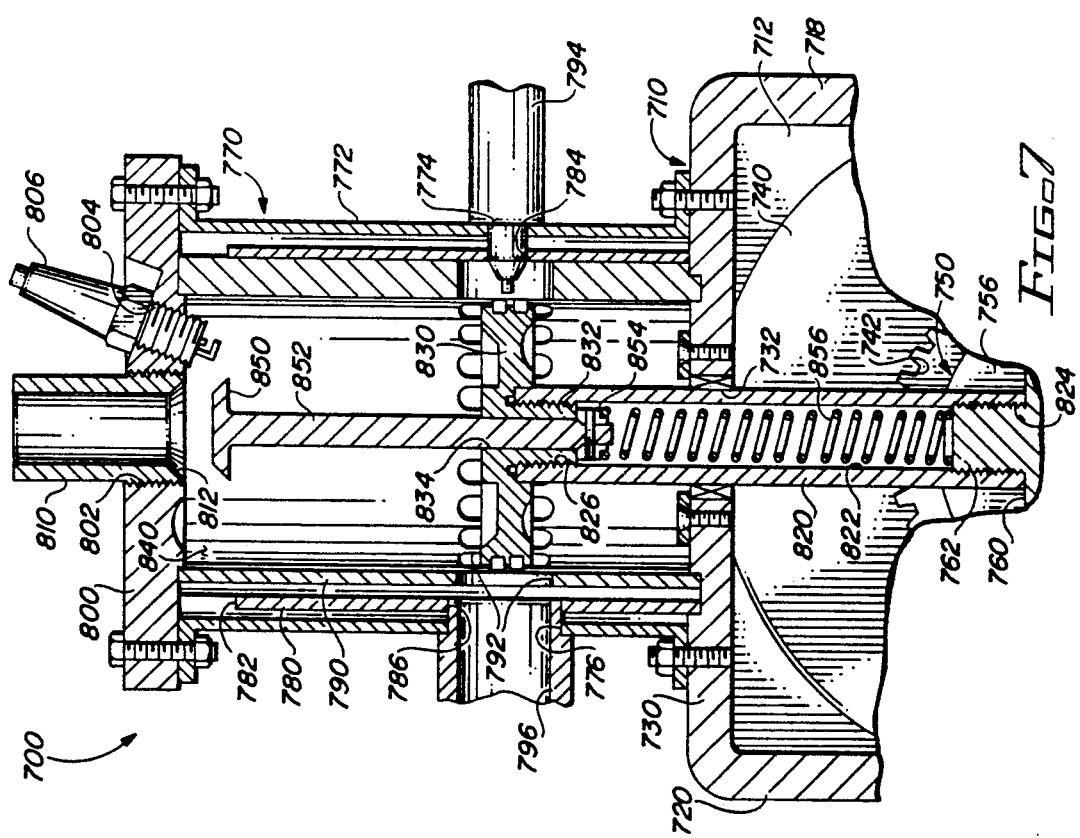

TWO-STROKE CYCLE ENGINE HAVING LINEAR GEAR DRIVE

BACKGROUND OF THE INVENTION

1. Field of the Invention

This invention relates to two-stroke cycle engines, and more particularly, to two-stroke cycle engines having a linear gear drive in which a piston rod unit moves linearly.

2. Description of the Prior Art

A linear gear drive system is a relatively simple gear relationship which includes a fixed ring gear and a pinion gear rotating within the ring gear for converting reciprocating linear motion into a balanced rotary motion.

With linear motion of a piston rod unit, the typical piston wrist pin required for non-linear type reciprocating engines is eliminated. This allows a smaller, lighter weight piston to be assembled to a piston rod as a one-piece unit. Moreover, linear motion of a piston rod unit allows the cylinder to be sealed at its lower base and thus to be isolated from the gearcase, and in fact this allows the cylinder to itself comprise two separate chambers, an upper chamber above the piston, and a second chamber below the piston.

Operating in a two-stroke cycle mode, with linear motion of the piston rod unit, the operation and timing of the valves is simplified. The intake valve need only be a relatively simple check valve, such as a reed valve, or the like, although the mass of intake air would be greater if a mechanically operated valve is employed. Because operation is two-stroke, valve timing and the corresponding mechanical control is relatively simple.

In prior art two stroke cycle engines, exhaust valves are typically ports covered and uncovered (closed and opened) by the piston itself. The exhaust valve, in the apparatus of the present invention, is operated from the center of the piston and piston rod assembly and it seats or extends into the cylinder head.

Linear motion of a piston rod is not a new motion. Rather, it is a relatively well-known hypocycloid type curve. A hypocycloid is a curve generated by a point on a circle when the circle is rolled inside a larger circle. When the diameter of the smaller circle is equal to the radius of the larger circle, or one-half the diameter of the larger circle, the hypocycloid becomes a straight line. In actuality, every point on the smaller circle then moves in a straight line.

The same type of hypocycloid linear motion occurs when a small pinion gear is rotated inside of a fixed, internal or ring gear, with the pitch diameter of the internal gear twice that of the pinion gear. Any point on the pitch circle of the pinion moves in a straight line inside the internal gear.

U.S. Pat. No. 587,380 (Ziegler) discloses this type of linear motion in a pump using symmetrical gearing to distribute forces and to eliminate side thrust.

U.S. Pat. No. 1,056,746 (Pitts) discloses the same type of linear motion in which two pairs of counterbalances are utilized. One pair of counterbalances is on the output shaft and the other pair of counterbalances is on the pinion assembly, and inside the first pair of counterbalances.

The mechanical movement described in the '746 patent was applied to an internal combustion engine by the same inventor. The internal combustion engine matured into U.S. Pat. No. 1,090,647.

U.S. Pat. No. 1,579,083 (Collins) discloses a similar linear gear movement in an opposed piston environment. Two pistons, aligned with each other and in cylinders on opposite ends of the gear system, are connected by aligned piston rods. The one set of gears and an output shaft are supported by the frame.

U.S. Pat. No. 2,886,976 (Dean) discloses various embodiments of systems for converting motion into linear movement.

U.S. Pat. No. 3,175,544 (Hughes) discloses internal combustion engines utilizing a slider mechanism for linear movement of piston rods and multiple pistons.

U.S. Pat. No. 3,258,992 (Hittell) discloses reciprocating piston engines utilizing a slider mechanism for linear movement and double opposed cylinders and pistons. That is, on a single crankshaft are at least two sets of piston rod units and each pair of piston rod units moves in opposed cylinders. In the basic environment, four cylinders are utilized.

U.S. Pat. No. 3,277,743 (Kell) discloses two different embodiments of linear motion mechanisms. The mechanical movement, or the mechanisms involved in mechanical movement, is disclosed in the '743 patent. No particular reference to an engine, a pump, compressor, etc., is discussed.

U.S. Pat. No. 3,329,134 (Llewellyn) discloses an internal combustion engine with opposed pistons utilizing a slider mechanism for linear movement.

U.S. Pat. No. 3,563,223 (Ishida) discloses another reciprocating engine environment utilizing linear gear movement. Again, opposed pistons are utilized.

U.S. Pat. No. 3,744,342 (Kinoshita) discloses a reciprocating piston engine utilizing an internal gear and a piston and crank mechanism for balancing primary inertia forces. The internal gear, which is fixed, has twice the number of teeth as a gear which rotates with the balance weight.

U.S. Pat. No. 3,791,227 (Cherry) discloses counterweight balancing of linear movement in an engine apparatus. There is no discussion on a particular type of engine. Rather the patent discusses engines in general terms of mechanical movement.

U.S. Pat. No. 3,886,805 (Koderman) discloses a crank gear system for converting linear movement into rotary movement. The apparatus is disclosed in terms of a crank gear and planetary crankshaft system.

U.S. Pat. No. 4,078,439 (Iturriaga-Notario) discloses compressor apparatus utilizing a slider mechanism for linear movement of opposed piston and cylinder systems.

U.S. Pat. No. 4,173,151 (Grundy) discloses a slider mechanism for linear movement in an engine in which the pistons are offset from each other, as in a vee configuration. Several different embodiments are shown, utilizing different piston and cylinder arrangements, but all involving linear piston rod movement.

U.S. Pat. No. 4,237,741 (Huf et al) discloses a modified hypocycloid gear and a mechanical transmission system. Several different embodiments, including different types of internal combustion engines, are disclosed.

SUMMARY OF THE INVENTION

The invention described and claimed herein comprises two-stroke cycle internal combustion engines utilizing linear movement of the piston rod and dynamic balancing of the reciprocating masses. Different embodiments are disclosed, each of them including a sealed gearcase and a two-chamber cylinder, one chamber above the piston and a second chamber below the piston. Different types of exhaust valve structures are illustrated, with each of the exhaust valves including structure extending outwardly from the piston.

Among the objects of the present invention are the following:

To provide new and useful internal combustion engine apparatus;

To provide new and useful two-stroke cycle internal combustion engine apparatus;

To provide new and useful internal combustion engine apparatus utilizing linear piston rod movement;

To provide new and useful exhaust valve apparatus for an internal combustion engine;

To provide new and useful hypocycloid gear movement having linear movement of a shaft connected to a pinion gear;

To provide new and useful linear piston rod movement in a two-stroke cycle engine;

To provide new and useful operating characteristics for internal combustion engines;

To provide new and useful operating characteristics for two-stroke cycle internal combustion engines;

To provide new and useful uniflow exhaust scavenging in internal combustion engines;

To provide new and useful apparatus for increasing the utilization of heat in internal combustion engines by the transfer of heat to the intake charge without diminishing the mass of intake charge;

To provide new and useful internal combustion apparatus having a lower intake chamber having a pressurized intake flow for better exhaust scavenging;

To provide new and useful internal combustion engine apparatus having a lower intake chamber for trapping piston blow-by;

To provide new and useful internal combustion engine having a lower intake chamber sealed to prevent gearcase contamination from piston blow-by;

To provide new and useful exhaust valve apparatus for an internal combustion engine;

To provide new and useful internal combustion engine apparatus in which the gearcase is insulated by the lower cylinder intake air from upper cylinder combustion heat;

To provide new and useful hypocycloid gear apparatus in which the linear transmission of forces results in fewer stresses for high compression operation;

To provide new and useful external combustion chamber apparatus; and

To provide new and useful combustion chamber apparatus external to an operating cylinder in which combustion pressure is converted to mechanical power.

BRIEF DESCRIPTION OF THE DRAWING

FIG. 3 is an exploded perspective view of a portion of the operating mechanism of the present invention.

FIGS. 4A, 4B, 4C, 4D, and 4E are simplified schematic representations of the sequential operating mechanism positions for the apparatus of the present invention.

FIG. 7 is a view in partial section of a portion of another alternate embodiment of the apparatus of the present invention utilizing a poppet exhaust valve.

FIG. 8 is a view in partial section of a portion of another alternate embodiment of the apparatus of the present invention utilizing a slider exhaust valve.

DESCRIPTION OF THE PREFERRED EMBODIMENT

Figures 1A, 1B:
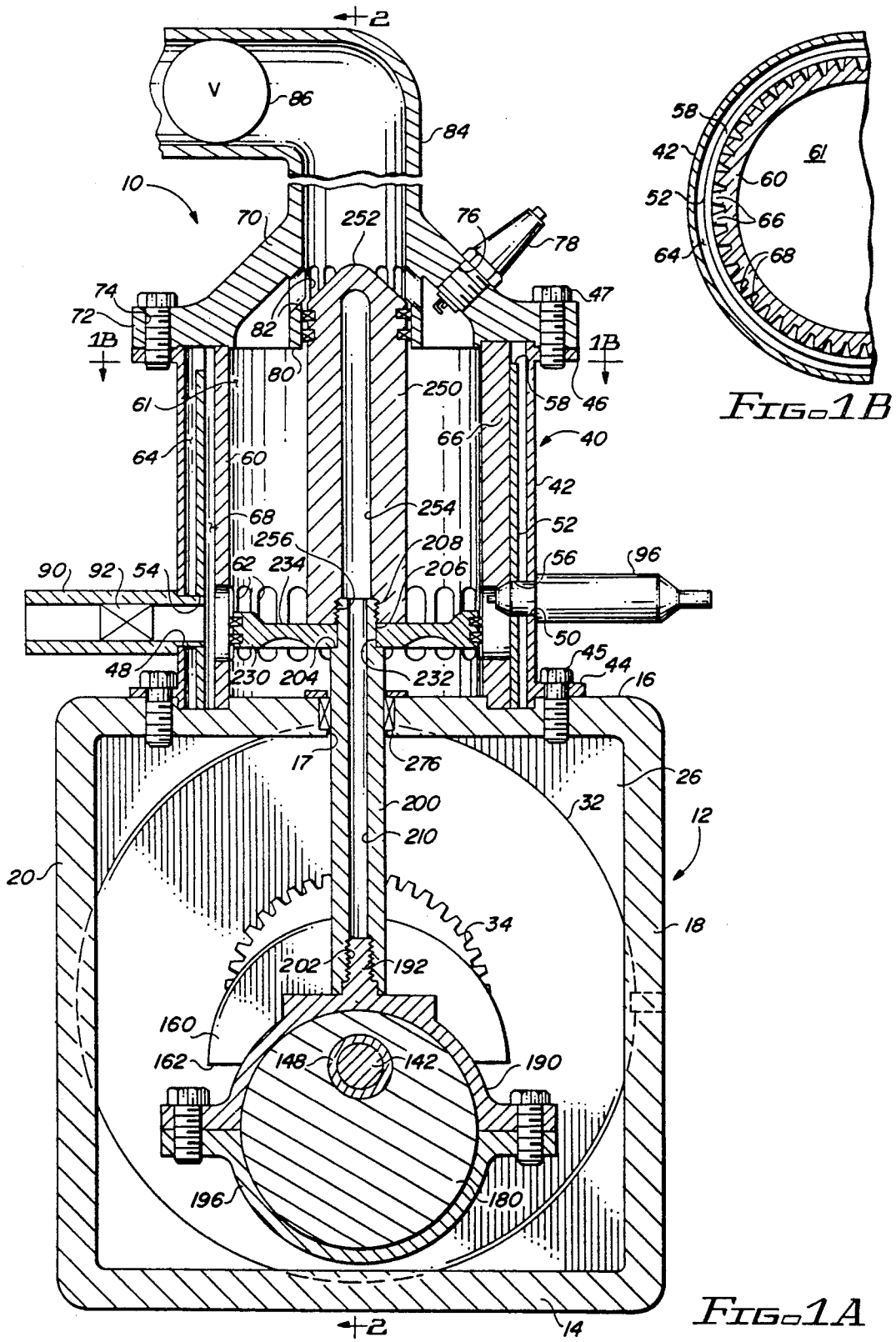
FIG. 1A is a view in partial section of the apparatus of the present invention.
FIG. 1B is a view in partial section taken generally along line 1B—1B of FIG. 1A.
Figure 2:
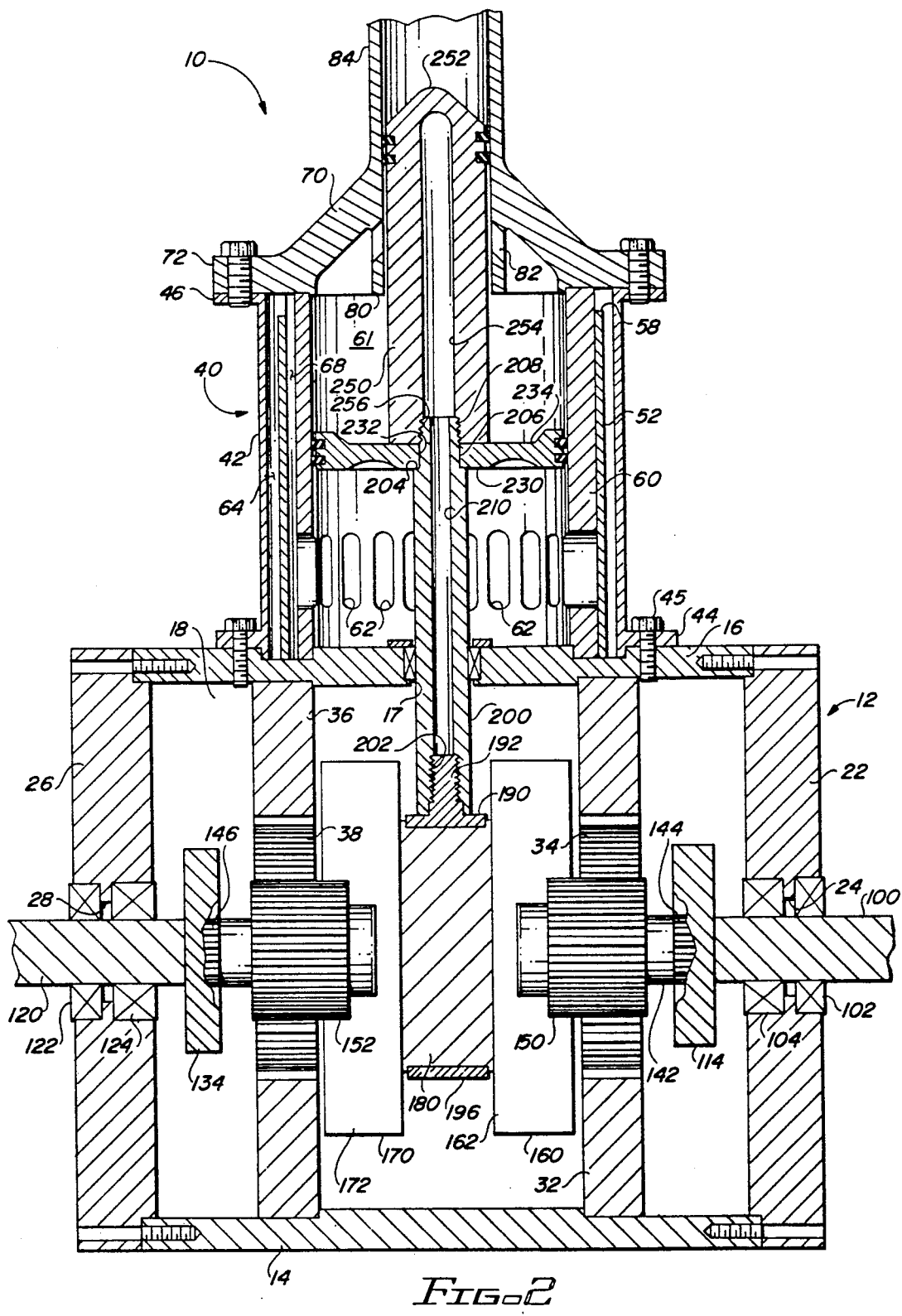
FIG. 2 is a view in partial section taken generally along line 2—2 of FIG. 1.

FIG. 1A is a view in partial section through engine apparatus 10 of the present invention. FIG. 1B is a view in partial section through an upper portion of the engine apparatus 10 of FIG. 1A, taken generally along line 1B—1B of FIG. 1A. FIG. 1B illustrates the relationship among the three concentric cylinders of the apparatus 10. FIG. 2 is a view in partial section through the engine apparatus 10 taken generally along line 2—2 of FIG. 1A. However, some of the mechanical elements of engine apparatus 10 have been rotated through ninety degrees of rotation in FIG. 2 from where they are shown in FIG. 1A. This will be discussed in detail. FIG. 3 is an exploded perspective view of a portion of the engine apparatus 10 of FIGS. 1A, 1B, and 2. For the following discussion, reference will be made to FIGS. 1A, 1B, 2, and 3.

The engine apparatus 10 includes a gearcase 12. The gearcase 12 includes a bottom plate 14, a top plate 16, and a pair of side plates 18 and 20. The bottom plate 14, the top plate 16, and the side plates 18 and 20 are appropriately secured together, and may be from a single casting. This is best shown in FIG. 1A. As shown in FIG. 2, the gearcase 12 also includes a pair of end plates, including an end plate 22 and an end plate 26. The end plates each include a bearing aperture or bore extending through them. A bearing aperture or bore 24 extends through the end plate 22, and a bearing aperture or bore 28 extends through the end plate 26.

Disposed within the gearcase 12 is a pair of fixed gear plates 32 and 36. The gear plates 32 and 36 are generally parallel to the end plates 22 and 26 and are fixed to the top and bottom plates 16 and 14, respectively. The gear plate 32 includes an internal ring gear 34, and the gear plate 36 includes an internal ring gear 38. The plates 32 and 36 are substantially parallel to each other, and the ring gears 34 and 38 are accordingly substantially parallel to and aligned with each other on a common axis. The ring gears 34 and 38 are coaxial with the bores 24 and 28 in the end plates 22 and 26, respectively.

A cylinder assembly 40 extends upwardly from the gear case 12. The top plate 16 of the gear case 12 includes a central hole or aperture 17. The cylinder assembly 40 is appropriately disposed on and secured to the top plate 16 and is coaxially aligned with the hole or bore 17. The vertical or longitudinal axis of the cylinder assembly 40 intersects at a right angle to and at the mid point of the horizontal or central axis aligning gears 34 and 38.

The cylinder assembly 40 includes three coaxial cylinders 42, 52, and 60. The cylinder 42 is the outer cylinder, the cylinder 52 is the middle cylinder, and the cylinder 60 is the inner cylinder.

Extending outwardly from the bottom of the outer cylinder 42 is a plurality of bolt flanges 44. Cap screws 45 extend into the top plate 16 to secure the cylinder assembly 40 to the gearcase 12.

The outer cylinder 42 also includes a bolt flange 46 extending outwardly from the upper portion of the cylinder 42. The bolt flange 46 cooperates with bolts or cap screws 47 to secure a cylinder head 70 to the cylinder assembly 40. This will be discussed in detail below.

The cylinder 42 includes an air intake aperture 48. An air intake conduit 90 is appropriately secured to the cylinder 42 about the aperture 48.

Diametrically opposite to the air intake aperture 48 is a fuel injector aperture 50 in the cylinder 42. A fuel injector 96 is appropriately secured to the cylinder 42 in the aperture 50.

While fuel injectors, such as the injector 96, are illustrated in conjunction with the apparatus 10 and in conjunction with the other embodiments, of the present invention, it will be understood that carburetion may also be used with the different embodiments. Some circumstances, or with a particular embodiment and a specific use, either carburetion or fuel injection may be preferable.

The middle cylinder 52 is spaced apart from the outer cylinder 42 an appropriate distance. The space between the cylinders 42 and 52 comprises a transfer chamber 64, as will be discussed below.

An air intake aperture 54 extends through the cylinder 52. The aperture 54 is aligned with the aperture 48. The air intake conduit 90 extends to and is appropriately secured about the aperture 54.

A fuel injector aperture 56 extends through the cylinder 52 and is aligned with the aperture 50 in the outer cylinder 42. The fuel injector 96 also extends through the aperture 56.

The middle cylinder 52 terminates below the head 70 at a top rim 58. The space between the rim 58 and the head 70 provides communication between the chamber 64 and a series of chambers 68. Details of the chambers 68 are best shown in FIG. 1B. The series of chambers 68 are disposed between the middle cylinder 52 and the inner cylinder 60. The chambers 68 are spaces or flutes between vertically extending ribs or ridges 66 on the fluted exterior periphery of the cylinder 60.

The ribs or ridges 66 extend longitudinally with respect to the cylinder 60. The outermost portions of the ribs 66 contact the inner periphery of the middle cylinder 52 for heat transfer purposes as well as for defining a plurality of chambers 68 between the cylinders 52 and 60. The chambers 68 are actually longitudinally extending flutes on the exterior of the cylinder 60. The top rim 58 provides virtually unrestricted communication between the chamber 64 and the chambers 68 for the transfer of the air between the chambers.

The inner cylinder 60 includes a plurality of lower transfer apertures or ports 62 which communicate between the chambers 68 and an interior combustion chamber 61 within the cylinder 60.

The plurality of transfer ports 62 extend through the cylinder 60 and communicate with each of the flutes or chambers 68. The transfer ports 62 are located below the midpoint of the cylinder 60 and spaced upwardly from the gearcase 12. Preferably, the ports 62 are disposed about the entire periphery of the cylinder 60 to provide a relatively even distribution for transferring the partially compressed intake air into the cylinder 60 from the chambers 68. The fuel injector 96 is aligned with one of the ports 62, as shown in FIG. 1.

Secured to the upper portion of the cylinder assembly 40 is the cylinder head 70. The cylinder head 70 includes an outwardly extending flange 72 which mates with the flange 46 of the outer cylinder 42. The flange 72 includes a plurality of apertures 74 aligned with apertures extending through the flange 46, and a plurality of appropriate bolts or screws 47 extends through the aligned apertures to secure the cylinder head 70 to the cylinder assembly 40. Obviously, appropriate gaskets or other sealing elements are used to seal the cylinder head 70, the cylinders of the cylinder assembly 40, and likewise the cylinder assembly 40 and the top plate 16, and also the side plates 22 and 26 to the elements which comprise the gearcase 12.

Extending through the cylinder head 70 is a spark plug hole 76. The spark plug hole 76 is appropriately tapped to receive the threaded portion of a spark plug 78.

An exhaust cylinder 80 extends downwardly from the center of the cylinder head 70. A plurality of exhaust ports 82 extend through the exhaust cylinder 80. The exhaust cylinder 80 is coaxially aligned with an exhaust stack 84 which extends upwardly from the cylinder head 70. The exhaust stack 84 in turn may communicate with an appropriate muffler system, etc.

The external side of the inner cylinder 60 is grooved or fluted to form the ribs or intake transfer baffles 66. The middle cylinder 52 is secured to the external side of the cylinder 60, and against the exterior periphery of the ribs or baffles 66. Between the cylinder 52 and the baffles 66 is the plurality of chambers 68. The outer cylinder 42 is aligned coaxially with the cylinder 52 to form the chamber or intake plenum 64, as discussed above. The chamber 64 communicates with the chambers 68 by way of the opening above the rim 58, which extends for a full three hundred sixty degrees.

In the embodiment shown, fuel is added to the transferring intake air from the fuel injector 96 when a piston 230 is approximately at the bottom of its stroke. This helps to insure that the scavenging of exhaust gases is substantially accomplished by only air, rather than by a charge of fuel and air.

An intake valve 92 is disposed in the conduit 90. If desired, the valve 92 may be a mechanically or electrically operated poppet valve which provides the greatest volumetric efficiency. However, a reed valve may also be used, as desired. The employment of a particular intake valve or intake valve design is well known and understood in the art, and may be configured as desired. The employment of a specific intake valve is not a part of the present invention, since such elements are well known and understood in the art.

Figure 6:
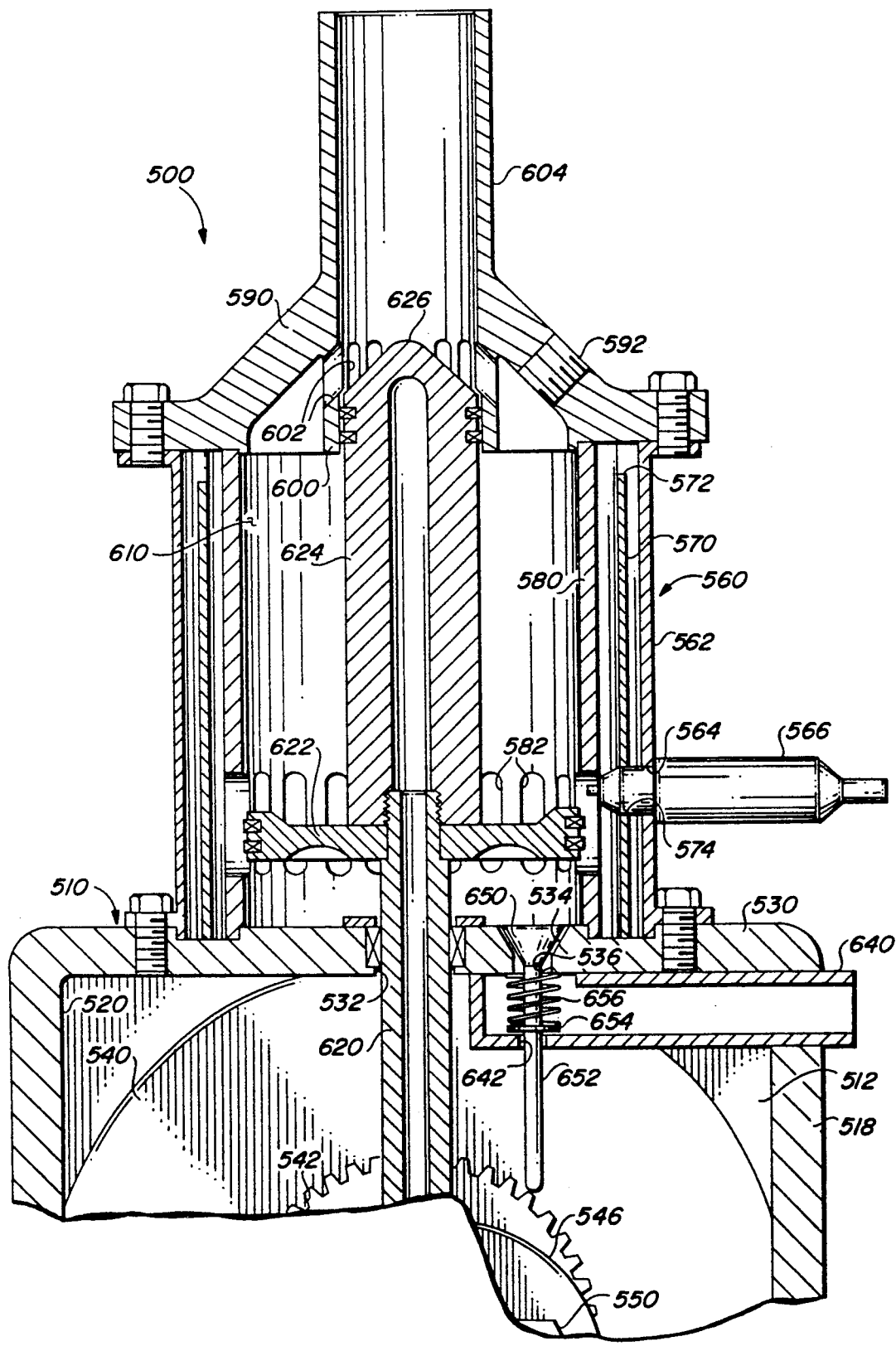
FIG. 6 is a view in partial section of another alternate embodiment of the apparatus of the present invention utilizing a poppet valve for controlling air intake.

Because the engine 10 is a two-stroke engine, the intake valve 92 may be operated directly from elements within the gearcase 12. An example of that is illustrated in FIG. 6, and will be discussed in setail in conjunction with FIG. 6.

An output shaft 100 extends through the bore or aperature 24 in the end plate 22. Disposed within counter bores in the bore 24 are an outer oil seal 102 and inner bearing 104.

A shaft counterweight 110 is appropriately secured to the output shaft 100. The shaft counterweight 110 is generally in the form of a half circle, with the shaft 100 extending outwardly from the diametrical center of the half circle. The counterweight 110 includes a front face 112. Extending outwardly from the front face 112 is a hub portion 114. The hub portion 114 includes an internally splined portion or bore 116. The internally splined portion or bore 116 is offset from, but generally parallel to, the axis of rotation of the shaft 100.

Extending through an aperture 28 in the end plate 26 is a timing shaft 120. The timing shaft 120 extends through an outer oil seal 122 and an inner bearing 124. The oil seal 122 and bearing 124 are appropriately disposed in counterbores in the end plate 26 and are coaxial with the bore or aperture 28.

A shaft counterweight 130 is secured to the timing shaft 120. The shaft counterweight 130 is substantially identical to the shaft counterweight 110, and is generally parallel thereto. The shaft counterweight 130 includes a front face 132 and a hub portion 134 that extends outwardly from the front face 132. An internally splined bore 136 extends through the hub portion 134. The splined bore or splined portion 136 is generally aligned with the internally splined bore 116 of the shaft counterweight 110.

A pinion shaft 142 extends between the shaft counterweight 110 and the shaft counterweight 130 and extends into the internally splined portions 116 and 136 of the counterweights 110 and 130 to couple the counterweights together for common or joint rotation. The coupling accordingly provides for the common rotation of the shafts 100 and 120.

The pinion shaft 142 is rotatably disposed within a pinion assembly 140. The assembly 140 extends through the fixed ring gears 34 and 38 and will be discussed in more detail below. The pinion assembly 140 is best shown in FIG. 3. Portions of it, are, of course, also shown in FIGS. 1 and 2.

The pinion shaft 142 rotates within the pinion assembly 140 on a bushing 148. The shaft 142 includes two ends, both of which are splined. One end of the shaft 142 includes external splines 144 which mate with the internal splines 116 of the shaft counterweight 110 to couple the output shaft 100 to the pinion shaft 142. The opposite end of the shaft 142 includes external splines 146. The splines 146 mate with the internal splines 136 of the shaft counterweight 130. The splined connection of the splines 136 and 146 couples the timing shaft 120 to the pinion shaft 142.

Adjacent to the splined end 144 of the shaft 142, but spaced apart longitudinally from the splines, is a pinion gear 150. The pinion gear 150 meshes with and rides in the ring gear 34 of the gear plate 32. Near the opposite end of the shaft 142, and adjacent to the splines 146, but spaced apart longitudinally from the splines 146, is another pinion gear 152. The pinion gear 152 meshes with and rides in the internal ring gear 38 of the gear plate 36. The pinion gears 150 and 152 are obviously aligned with each other.

Adjacent to the pinion gear 150 is a counterweight 160. The counterweight 160 is, like the counterweights 110 and 130, in the general configuration of a half circle. The counterweight 160 includes a flat face 162.

Adjacent to the pinion gear 152 is a counterweight 170. The counterweight 170 is substantially identical to and aligned with the counterweight 160. The counterweight 170 includes a flat face 172 which is aligned generally parallel to the flat face 162 of the counterweight 160.

Between the counterweights 160 and 170 is a grooved journal hub 180. The journal hub 180 is connected to the piston 230, as discussed below. The pinion gears 150 and 152, the pinion counterweights 160 and 170, and the journal 180 are preferably made in a single unit (or machined from a single casting), with a bore extending through the unit coaxially aligned with the pinion gears. The bushing 148 is disposed in the bore, and the shaft 142 is rotatably disposed in the bushing. The bushing 148, the pinion gears 150 and 152, the counterweights 160 and 170, and the journal 180 comprise the pinion assembly 140.

The pinion counterweights 160 and 170 are disposed on the pinion gears 150 and 152 to counterbalance a piston and rod assembly relative to the centerline of pinion shaft 142. The pinion counterweights 160 and 170 are similar to the shaft counterweights 110 and 130, and are generally aligned therewith, but rotate in opposite directions.

The pinion journal hub 180 is disposed between the pinion counterweights 160 and 170. The center axis of hub 180 intersects at a right angle the pitch circle of pinion gears 150 and 152. With the pinions 150 and 152 rigidly connected to the counterweights 160 and 170 and to the hub 180, it will be seen that rotary movement of the hub 180 will cause the joint rotation of the counterweights 160 and 170. Rotary movement of the pinion assembly 140 and its pinion gears 150 and 152 will also occur.

Disposed within the inner cylinder 60 of the cylinder assembly 40, and extending through an appropriate oil wipe and pressure seal 276 in the aperture 17 of the top plate 16, is a piston rod 200. The piston rod 200 extends into the gearcase 12. The piston rod 200 is of a tubular configuration, and it includes an internally threaded portion 202 at the bottom or lower end of the rod 200.

The internally threaded portion 202 of the piston rod 200 is secured to an externally threaded boss 192 of a rod bearing 190. The rod bearing 190 is secured about the journal hub 180 by cap 196 using any appropriate fasteners, such as cap screws, in a well known and understood manner.

At the top of the piston rod 200 there is a shoulder 204 and an upwardly extending portion 206 above the shoulder 204. At the top of the upper portion 206 is an externally threaded portion 208. Within the piston rod 200, and extending substantially its full length, is a bore 210.

A bore 232 extends through the piston 230. The top or upper portion 206 of the piston rod 200 extends through the bore 232 with the upper threaded portion 208 extending above the piston 230. The piston 230 is disposed on the top shoulder 204 of the piston rod 200 within the cylinder 60. An exhaust valve rod 250 is secured to the threaded portion 208 of the rod 200 and secures the piston 230, the rod 200, and the rod 250 together. If desired, the piston 230 and the piston rod 200, and an exhaust valve rod 250, may be made in one piece.

The piston rod 200 is secured to the rod bearing 190 through the connection of the internally threaded bottom portion 202 with a threaded boss 192. The journal or rod bearing 190 in turn fits around the pinion journal hub 180 in a circumferentially extending groove 182. The rod bearing cap 196 mates with, and is appropriately secured to, the rod bearing 190 in the groove 182 about the journal hub 180.

Extending downwardly from the top of the piston 230 is a dish-shaped depression which includes a flat bottom 234. Appropriate seal rings, which are preferably self-lubricating, etc., are disposed about the periphery of the piston 230.

An exhaust valve rod 250 extends upwardly through the cylinder 60 and is appropriately secured to the piston rod 200. The bottom of the valve rod 250 is disposed on the flat bottom 234 of the depression on the top of the piston 230. Within the rod 250 is a bore 254. At the bottom end of the bore 254 is an internally threaded portion 256 which appropriately mates with the externally threaded portion 208 of the piston rod 200. The valve rod 250 accordingly secures the piston 230 to the piston rod 200, and is in turn itself secured to the piston rod 200.

The valve rod 250 is generally cylindrical and is movably disposed within an exhaust cylinder 80. The exhaust cylinder 80 comprises a coaxially aligned cylinder portion of the cylinder head 70. The exhaust cylinder 80 includes a plurality of exhaust ports 82 below the cylinder head 70, and an upwardly extending exhaust stack 84 above the cylinder head. In FIG. 1, the valve rod 250 is positioned at the lower end of the exhaust cylinder 80, thus uncovering the exhaust ports 82 to provide communication between the cylinder 60 and the exhaust stack 84 through the exhaust ports 82.

A valve 86 is schematically represented as being disposed in the exhaust stack 84. The valve 86 may be a controller poppet valve or butterfly valve, etc.

The purpose of the valve 86 is to allow the exhaust stack 84, or essentially the exhaust ports 82, to be restricted, if necessary, before the transfer ports 62 are closed by the upward movement of the piston 230. Thus, only the exhaust gases are vented, and not a significant portion of the incoming charge of air or air and fuel.

The restriction of the exhaust ports (or stack) may also be controlled by a controlled telescoping exhaust stack, not shown. In whatever manner the restriction of the exhaust ports or stack is controlled, the intent is to match or time the exhaust flow with the transfer flow of air into the chamber 61 of the cylinder 60 at various operating speeds so that only the exhaust gases flow out of the cylinder and not a significant portion of the fresh incoming charge of air.

The valve rod 250 includes a generally pointed and closed top 252. An interior bore 254 extends the full length of the rod from a lower threaded portion 256 to the top 252. The bore 254 communicates directly with the interior bore 210 of the piston rod 200. The bore 254 is essentially non-functional, serving only to lighten the weight of the rod 250, the rod 200, and the piston 230, all of which are secured together.

It will be noted that the exterior diameter of the rod 250 is substantially greater than that of the rod 200. The reason is, of course, that the upper portion of the rod 250 functions as a valve in the exhaust cylinder 80 and the stack 84.

Appropriate sealing elements, preferably self-lubricating, rings, extend about the top of the rod 250, below the point or end 252. In FIG. 1, the piston 230 is shown at its lowest point. The upper portion of the rod 250 is within the exhaust cylinder 80. A portion of the rod 250 remains in the exhaust cylinder 80 at all times as it moves to cover and uncover the exhaust ports 82.

In FIG. 2, the exhaust valve rod 250 is shown moved upwardly, above the exhaust ports 82, blocking the communication between the cylinder 60 and the exhaust stack 84.

In FIG. 1, the piston 230 is at the bottom of its stroke, and the exhaust ports 82 are open to allow the combustion gases or exhaust gases to flow from the upper or combustion chamber 61 of the cylinder 60 upwardly and outwardly through the exhaust stack 84. It will be noted that the flow of the intake air and exhaust gases is uniflow, or in one direction only, namely upwardly from the transfer ports 62 and outwardly through the ports 82 into the exhaust stack 84.

The piston 230 is shown in FIG. 1 providing communication from the intake plenum 64 and from the portion of the cylinder 60 beneath the piston 230 to the chamber 61 above the piston 230 through the transfer ports 62. As the piston 230 moves up to its mid-position as shown in FIG. 2, the transfer ports 62 are blocked from communicating with the portion of the chamber 61 above the piston, thus allowing the piston 230 to compress the fuel and air charge further as it moves upwardly.

The exhaust rod 250 is shown in FIG. 2 above the exhaust ports 82, thus sealing the cylinder 60 above the piston 230. While the piston 230 moves upwardly, and after passing the intake ports 62, the vacuum or low pressure created in the lower portion of the chamber 61 and cylinder 60 below the piston 230 causes air to be drawn into that chamber through intake conduit 90, intake valve 92, and transfer ports 62.

At the appropriate time, with respect to the location of the piston 230, the spark plug 78 fires, igniting the compressed fuel and air mixture above the piston 230 within the cylinder 40. Timing for the spark plug 78 is not shown, since such is well known and understood. Similarly, as has been stated above, if a poppet valve or some other type of valve other than a reed valve is used for the intake valve 92 in the intake conduit 90, the control of that valve also needs to be mechanically provided for. Again, the valve timing elements are well known and understood in the art, and need not be shown in detail herein.

From the power generated during combustion, the piston 230 is moved downwardly by the expanding gases. When the exhaust rod 250 opens the ports 82, the exhaust gases flow upwardly through the exhaust ports 82 and upwardly through the exhaust stack 84 and outwardly from the engine apparatus 10.

As the piston 230 moves downwardly, the air beneath the piston is compressed in a precompression step well known and understood in the two-stroke cycle engine art. Obviously, the valve 92 closes to prevent the air charge from flowing back out through the intake conduit 90. Instead, the air charge flows through the intake transfer chamber 68 and past or along the baffles 66 where it absorbs heat from the wall of the cylinder 60. The transfer of heat provides a degree of cooling for the combustion chamber 61. At the same time, the heat transfer does not diminish the volumetric efficiency of the engine apparatus 10. The mass of the intake charge of air is not lessened by the heat transfer, but a cooling effect occurs for the upper portion of the cylinder 60. The air then flows into the intake plenum 64 through the transfer slot defined between the top 58 of the cylinder 52 and the cylinder head 70.

The contacts between the ribs 66 of the inner cylinder 60 with the middle cylinder 52 facilitates the heat transfer from the inner cylinder 60 to both the middle cylinder and to the air flowing in the flutes 68 and in the transfer chamber 64 between the outer cylinder 42 and the middle cylinder 52.

The momentum of the engine causes the downstroke to move over center, and the piston 230 then moves upwardly on its compression stroke. As is known and understood in the two-stroke cycle engine art, the downstroke is considered the power and the exhaust/transfer stroke, and the upstroke is considered the intake and compression stroke. As the piston 230 moves downwardly and valve rod 250 clears the top of exhaust ports 82, the exhaust gases begin their upward flow out of the combustion chamber 61 within the cylinder 60. As soon as the piston 230 clears the top of the ports 62, the ports 62 comprise transfer ports for transferring the partially compressed air from beneath the piston 230 and from the intake plenum 64 and the chambers 68 upwardly into the upper portion of the cylinder 60 above the piston 230. With the exhaust gases having been scavenged by plenum air, fuel is injected by the injector 96 at this time so as to prevent the loss of unburned fuel through the exhaust ports. This timing of the injection of fuel also minimizes fuel condensation.

As the piston 230 moves above the ports 62, the upper portion of the cylinder 60 is again sealed from the lower portion of the cylinder 60. By this time, the valve rod 250 has also closed the exhaust ports 82, thus effectively sealing the chamber 61 above the piston 230. The air and fuel mixture above the piston 230 is then compressed preparatory to the firing of the spark plug 78.

After the firing of the spark plug, the cycle begins again as the piston 230 starts to move downwardly. The cycle then repeats itself, with the appropriate timing of the valve 92 and of the injection of the fuel by the fuel injector 96, and the firing of the spark plug 78, as required.

The piston rod or connecting rod 200 is appropriately sealed in the top plate 16 so that there is no communication between the cylinder assembly 40 and the interior of the gearcase 12. Essentially, this prevents contamination of the atmosphere within the gearcase 12 by the fuel-air mixture within the cylinder 60 and by the exhaust gases.

There are essentially two separate and sealed chambers in the cylinder 60, including a chamber beneath the piston 230 and above the plate 16, and the chamber above the piston 230 and beneath the cylinder head 70. Any piston blow-by from the upper chamber, which comprises the combustion chamber, is captured or trapped in the lower chamber beneath the piston and is recirculated back into the upper, combustion, chamber. The gear case 12 comprises a chamber sealed and separate from both chambers in the cylinder 60.

The sealed gear case 12, separate from the cylinder assembly 40, also provides an insulating function to protect the gear elements from the heat generated by the combustion process. With the fresh charge of air admitted beneath the piston 230, and accordingly in the lower chamber of the cylinder 60, there is an element of cooling or insulating that helps to protect the gear case 12 and its elements from the heat generated by the combustion processes in the upper chamber of the cylinder 60.

In most prior art two-stroke cycle engines, precompression is accomplished within the crankcase or open area beneath the piston, and oil must accordingly be mixed with fuel (gasoline) to provide lubrication for the various engine parts beneath the piston. This, of course, is not required in the apparatus of the present invention, since the gearcase is a sealed unit, separate from the portion of the cylinder 60 and the cylinder assembly 40 beneath the piston 230.

It will be noted that the hypocycloid gear apparatus of the present invention provides for a generally linear movement of the piston rod 200 and also of the exhaust valve rod 250, which is coaxially aligned with the piston rod 200 and is appropriately secured thereto. The hypocycloid gearing, including the pinion gears 150 and 152 moving within the fixed ring gears 34 and 38, respectively, describe circles as they move in the ring gears. However, any point on the pitch circle of the pinions 150 and 152 remains fixed in a straight line due to the geometry of the pinions 150 and 152 with respect to their ring gears 34 and 38. The center axis or longitudinal axis of the piston rod 200, and of the exhaust valve rod 250, pivots at or on the pitch circle of the pinion shaft 142. See FIGS. 4A, 4B, 4C, 4D, and 4E, which will be discussed in detail below. A linear movement of the piston rod 200 is accordingly accomplished. Obviously, with only linear movement of the piston rod 200, there is substantially less wear and tear on the rod 200 and on its seal 276 in the plate 16. There is also substantially less wear on the piston 230, and on its self-lubricating seal rings since there are no side forces involved. This in turn substantially diminishes the wear within the cylinder 60.

It will be noted that the only timing required of the engine is with the spark plug 78, the fuel injector 96, and with the intake valve 92, provided the valve 92 is not a reed valve, and provided fuel injection is used instead of carburetion. If the valve 92 is a reed valve, it simply closes when the pressure within the cylinder 60 beneath the piston 230, as transmitted through the transfer ports 62 and to the intake conduit 90, is greater than the upstream pressure which causes the reed valve to open.

The exhausting of the combustion gases is timed in simple response to the movement of the piston rod 200 and the exhaust rod 250 secured to the piston rod 200. A simple geometric or arithmetic relationship exists, as defined by the location of the exhaust ports 82 in the exhaust cylinder 80 with respect to the length or height of the exhaust rod 250. Changing the vertical location of the rod 250 by changing the height or length of the rod 250 changes the relationship with or by the degree of output shaft rotation.

It will also be noted, as briefly mentioned above, that there is a unidirectional flow through the cylinder 60. From the cylinder 60 beneath the piston 230, the partially compressed air charge moves upwardly through the intake or transfer ports 62 into the cylinder 60 above the piston 230. The exhaust ports 82 are now uncovered, and the flow of the exhaust gases, from the firing of the spark plug and the resulting combustion, extends in an upwardly direction. Thus, there is a unidirectional flow of both the incoming air charge and the outgoing exhaust gases. Fuel is then injected just prior to the closing of the ports.

FIGS. 4A, 4B, 4C, 4D, and 4E are sequential schematic representations illustrating the mechanical movement involved in the hypocycloid gearing of the apparatus of the present invention and showing the accompanying piston movement. For the following discussion, the primary reference will be the clockwise rotation of the output shaft 100. Obviously, the shaft 100 moves in response to movement of the piston 230 and the shaft 200 and the associated elements as transmitted to the shaft 100. However, the understanding of the apparatus may best be understood by reference in FIGS. 4A, 4B, 4C, 4D, and 4E to the rotation of the shaft 100.

In FIG. 4A, the piston 230 is at bottom dead center, and its counterweight 160 is at its top position. The counterweight 110 for the output shaft 100 is also at its top position.

As the shaft 100 rotates clockwise through about forty five degrees, to the position shown in FIG. 4B, the counterweight 110 also moves the same amount. The counterweight 160 moves forty five degrees counterclockwise and the piston 230 moves upwardly.

In FIG. 4C, the shaft 100 and its counterweight continues to move clockwise, and is now ninety degrees from the position shown in FIG. 4A. The counterweight 160 is also ninety degrees from its position shown in FIG. 4A, but its movement is counterclockwise. The piston 230 is now at its halfway location, as also shown in FIG. 2.

Figures 4D, 4E:
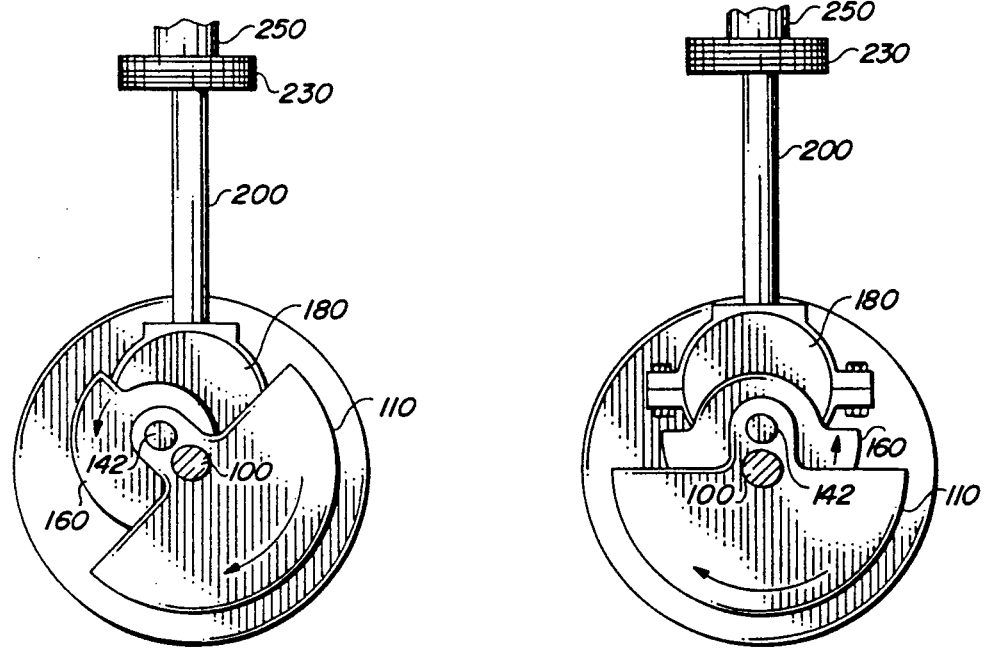

FIGS. 4D and 4E continue the clockwise rotation of the shaft 100 by a forty five degree increment. In FIG. 4E, the piston is at its top dead center position and the shaft 100 has moved through a total of one hundred eighty degrees from the initial position shown in FIG. 4A.

OPPOSED CYLINDER EMBODIMENT

Figure 5:
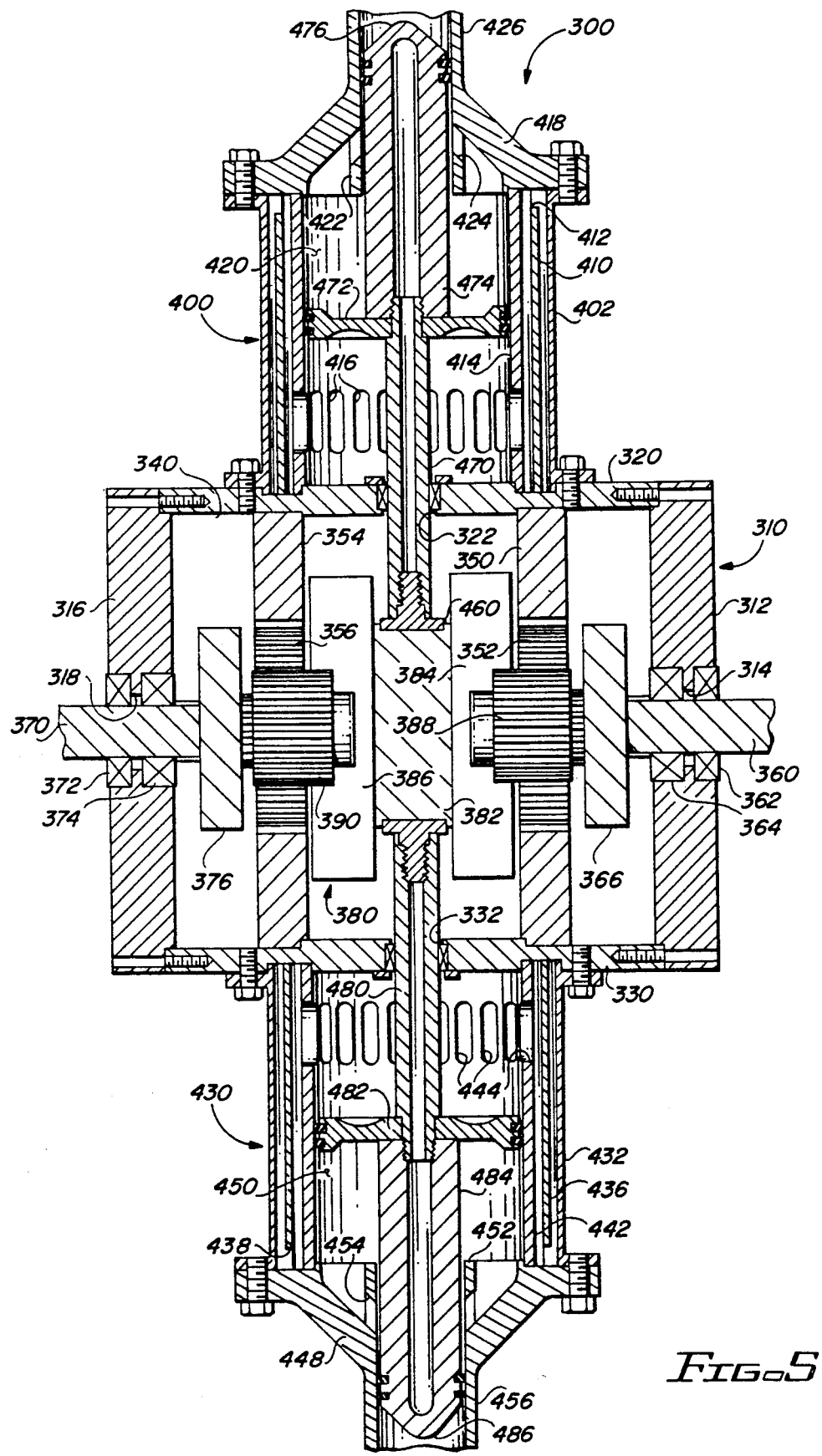
FIG. 5 is a view in partial section of an alternate embodiment of the apparatus of the present invention showing opposed cylinder arrangement.

FIG. 5 is a view in partial section of an alternate embodiment of the apparatus of the present invention, comprising an opposed cylinder engine apparatus 300. The engine apparatus 300 includes substantially the same gear case and related elements, but instead of utilizing a single cylinder as in the engine apparatus 10 discussed above in conjunction with FIGS. 1–4, engine apparatus 300 includes two opposed cylinders oriented substantially 180 degrees to each other. The cylinders each include a piston connected to a piston rod, and the piston rods and pistons move linearly and are 180 degrees opposed from each other.

The engine apparatus 300 includes a gear case 310 which includes a pair of end plates 312 and 316. The end plate 312 includes a bearing bore 314 extending through it, and the end plate 316 includes a bearing bore 318 extending through it.

Connected to the end walls 312 and 316 is a pair of cylinder plates, including a cylinder plate 320 and a cylinder plate 330. The cylinder plate 320 includes a bore 322 and the cylinder plate 330 includes a bore 332.

The gear case 310 also includes a pair of end walls, of which an end wall 340 is shown in FIG. 5. The end plates, cylinder plates, and end walls are appropriately secured together to comprise a housing in which is disposed a pair of gear plates extending between the cylinder plates and the end walls, and generally parallel to the end plates 312 and 316.

The gear plates include a gear plate 350 and a gear plate 354. The gear plate 350 includes an internal ring gear 352. The gear plate 354 includes an internal ring gear 356.

An output shaft 360 extends through the bearing bore 314. The output shaft 360 is sealed in the end plate 312 and rides on a pair of bearing and seal elements, including an outer seal 362 and an inner bearing 364. A hub 366 of a shaft counterweight is secured to the output shaft 360.

A timing shaft 370 extends through the bore 318 in the end plate 316. The timing shaft 370 is appropriately journaled for rotation in a pair of bearing and seal elements, including an outer seal 372 and an inner bearing 374. A hub 376 of a shaft counterweight is appropriately secured to the timing shaft 370.

A pinion assembly 380 is located between the output shaft 360 and the timing shaft 370. The pinion assembly 380 includes a grooved journal hub 382 and a pair of counterweights 384 and 386. The pinion assembly 380 also includes a pair of pinion gears 388 and 390. The pinion gear 388 matingly engages the internal ring gear 352 in the plate 350 and the pinion gear 390 matingly engages and rotates in the internal ring gear 356 in the plate 354. A pinion shaft internal to the pinion gear 388 is secured to the hub 376 of the shaft counterweight (not shown) by a splined engagement. Similarly, the same pinion shaft internal to pinion gear 390 is secured to the hub 366 of the shaft counterweight (not shown) by another splined engagement.

It will be noted that the output and timing shafts 360 and 370, respectively, their respective counterweights and bearings, the pinion shaft, and the pinion assembly 380, its counterweights, and gears, are all substantially identical to the corresponding elements within the gear case 12 of the engine apparatus 10, as discussed above in conjunction with FIGS. 1A–4.

Secured to the cylinder plate 320 is an "upper" cylinder assembly 400. The cylinder assembly 400 includes an outer cylinder 402, a middle cylinder 410, and an inner cylinder 414. A cylinder head 418 is in turn secured to the outer cylinder 402, the middle cylinder 410, and the inner cylinder 414. The cylinders 402, 410, and 414 are concentric cylinders, and are substantially identical to the cylinder assembly 40 discussed above, including the outer cylinder 42, the middle cylinder 52, and the inner cylinder 60. Similarly, the cylinder head 418 is substantially identical to the cylinder head 70 of the engine apparatus 10.

The middle cylinder 410 includes a transfer slot 412 above its top rim and beneath the adjacent bottom of the cylinder head 418. The inner cylinder 414 is configured substantially the same as the inner cylinder 60, discussed above, with a plurality of axially extending flutes and ribs, etc. The exterior of the ribs of the cylinder 414 are likewise in direct contact with the interior periphery of the middle cylinder 410. The inner cylinder 414 includes a plurality of transfer apertures 416.

The cylinder head 418 is appropriately secured to the cylinders 402 and 414.

Extending downwardly beneath the cylinder head 418, and within the upper portion of the inner cylinder 414, is a combustion chamber 420.

Extending downwardly from the cylinder head 418 and into the upper portion of the combustion chamber 420 is an exhaust cylinder 422. The exhaust cylinder 422 includes a plurality of exhaust ports 424. Extending upwardly from the cylinder head 418, and communicating with the exhaust cylinder 422, is an exhaust stack 426. The exhaust ports 424 provide communication between the exhaust stack 426 and the combustion chamber 420. The exhaust cylinder 422 and the exhaust stack 426 are coaxially aligned with the cylinder head 418 by the cylinder assembly 400.

Aligned with the cylinder assembly 400, and secured to the cylinder plate 330, is a "lower" cylinder assembly 430. The cylinder assembly 430 includes an outer cylinder 432, a middle cylinder 436, and an inner cylinder 442. The middle cylinder 436 includes a transfer slot 438, and the inner cylinder 442 includes a plurality of transfer apertures or ports 444. The three cylinders 432, 438, and 442 are appropriately secured to the plate 330 and are closed at the top by a cylinder head 448. Beneath the cylinder head 448 and within the inner cylinder 442 is a combustion chamber 450.

An exhaust cylinder 452 extends from the inner portion of the cylinder head 448 into the "upper" portion of the combustion chamber 450. An exhaust stack 456 extends from the cylinder head 448 and is aligned with the exhaust cylinder 452. A plurality of exhaust ports 454 extends through the exhaust cylinder 452 to provide communication between the combustion chamber 450 and the interior of the exhaust cylinder 452 and the exhaust stack 456.

The cylinder assemblies 400 and 430 are substantially identical to each other, and they are essentially mirror images of each other. They are each, as indicated above, substantially identical to the cylinder assembly 40 of the engine apparatus 10.

A rod bearing 460 is disposed within the groove of the grooved journal hub 382. Two piston rods are secured to the rod bearing 460, and extending diametrically outwardly from the rod bearing 460. The piston rods include a piston rod 470, which extends through the bore 322 in the cylinder plate 320, and a piston rod 480 which extends through the bore 332 in the cylinder plate 330. The bores 322 and 332 are appropriately sealed, etc., to prevent communication between the gear case 310 and the respective cylinder assemblies 400 and 430, except for the piston rods 470 and 480.

A piston 472 is appropriately secured to the piston rod 470. Extending outwardly from the piston 472, and appropriately secured to the piston rod 470 and to the piston 472 is an exhaust valve rod 474. The exhaust valve rod 474 extends into the exhaust cylinder 422 and the exhaust stack 426. The exhaust valve rod 474 includes a distal tip 476 which closes the outer end of the valve rod 474 remote from the piston 472.

A piston 482 is appropriately secured to the piston rod 480 within the inner cylinder 442. An exhaust valve rod 484 is appropriately secured to both the piston rod 480 and the piston 482. The exhaust valve rod 484 includes a distal tip 486 remote from the piston 482. The exhaust valve rod 484 extends into the exhaust cylinder 452 and the exhaust stack 456.

The piston rods, pistons, and exhaust valve rods are substantially the same as discussed above in conjunction with engine apparatus 10. The respective combustion cylinders 420 and 450 are disposed between the respective cylinder head and piston pairs 418, 472 and 448, 482. The operation of the engine apparatus 300 is substantially identical to the operation of the engine 10 except that two cylinder assemblies with their pistons and exhaust valve rods are operable within the respective cylinder assemblies and secured to the common pinion assembly 380. As one piston is on its intake and compression stroke, the other piston will be on its power and exhaust stroke. Again, there is linear movement of the respective piston rods and pistons, all as discussed above in conjunction with FIGS. 1-4.

Essentially, the engine apparatus 300 is a doubled system from that shown in conjunction with the engine apparatus 10 of FIGS. 1-4. Thus, one complete revolution of the pinion assembly 380 will produce two power strokes instead of one power stroke. Furthermore, it is obvious that additional cylinders could be added to the gear case 310 ninety degrees from the cylinder assemblies 400 and 430 to provide a four cylinder arrangement with four opposed cylinders ninety degrees apart connected to a common pinion assembly. In such case, there would be four power strokes for each complete revolution of the pinion shaft assembly.

A pinion assembly for a four cylinder embodiment would be modified from that shown in FIG. 5. The second double piston arrangement would be perpendicular to the double piston arrangement of FIG. 5. The basic four cylinder arrangement is illustrated in the Pitts '746 patent, which is discussed above under the "Background of the Invention."

It will be noted that the air intakes, fuel injectors, and spark plugs have been omitted from FIG. 5. They are substantially the same as discussed above in conjunction with FIGS. 1 and 2, and particularly as illustrated in FIG. 1. Accordingly, they need not be discussed in detail again.

Because of the rigid connection of the double piston and rod elements, the transmission of combustion force is transmitted directly from one piston to the pinion journal and to the other piston simultaneously. Consequently, there are no sidewall or other undesirable forces acting on the cylinder walls or gear mechanisms. Accordingly, this embodiment is especially advantageous for high compression, high power operation.

POPPET VALVE AIR INTAKE EMBODIMENT

FIG. 6 is a view in partial section of engine apparatus 500 comprising an alternate embodiment of the apparatus of the present invention. The engine apparatus 500 comprises an alternate embodiment of the apparatus discussed in detail above in conjunction with FIGS. 1-4 and FIG. 5.

It will be noted that the embodiment of FIG. 6 includes only the upper portion of a gear case 510, and very little of a pinion assembly disposed therein. Only the elements necessary for an understanding of the engine apparatus 500 have been included. It will be understood that the pinion assembly usable in engine apparatus 500 is substantially the same as the pinion gear assembly discussed in detail above.

The engine apparatus 500 includes a gear case 510, and the gear case 510 includes a pair of end plates, of which an end plate 512 is shown. The gear case also includes a pair of side plates 518 and 520, portions of which are shown. A bottom plate is not shown.

Generally parallel to the bottom plate (not shown) there is a top cylinder plate 530. Centrally disposed in the top cylinder plate 530 is a bore 532.

Within the gear case 510 is shown a gear plate 540 with an internal ring gear 542 therein. A portion of a counterweight 546 of the pinion assembly is also illustrated, as is also a portion of a journal hub 550. As indicated, the various elements involved are substantially the same as disclosed above, in particular, in conjunction with engine apparatus 10.

A cylinder assembly 560 is appropriately secured to the top cylinder plate 530 of the gear case 510. The cylinder assembly 560 includes an outer cylinder 562. Extending through the outer cylinder 562 is an injector port or aperture 564. A portion of a fuel injector 566 is shown extending through the aperture or port 564.

Spaced apart coaxially inwardly from the outer cylinder 560 is a middle cylinder 570. The middle cylinder 570 includes a transfer slot 572 at its upper portion. Aligned with the fuel injector or port 564 is a fuel injector port or aperture 574. A portion of the fuel injector 566 is shown extending through the injector portion 574.

Coaxially aligned with the cylinders 560 and 570 is an inner cylinder 580. The inner cylinder 580 includes a plurality of transfer ports or apertures 582.

The cylinder assembly 560 is closed by a cylinder head 590. The cylinder head 590 is, of course, appropriately secured to the cylinders 562 and 580. A spark plug port 592 is shown extending through the cylinder head 590.

An exhaust cylinder 600 extends downwardly from the center portion of the cylinder head 590. The exhaust cylinder 600 includes a plurality of exhaust ports 602. Extending upwardly from the exhaust cylinder 600 and the cylinder head 590 is an exhaust stack 604.

A combustion chamber 610 is disposed within the upper portion of the inner cylinder 580 and beneath the cylinder head 590.

A piston rod 620 is shown extending upwardly. The piston rod 620 is appropriately secured to the journal hub 550, only a portion of which is illustrated in FIG. 6. The piston rod 620 extends through a bore 532 in the cylinder plate 530. The bore 532 includes an appropriate seal for the rod 620.

Secured to the piston rod 620 within the inner cylinder 580 is a piston 622. The piston 622, like the pistons discussed above in conjunction with the engine apparatus 10 and 300, includes appropriate seal rings, as is well known and understood in the art.

Extending upwardly from the piston 622, and appropriately secured to the rod 620, is an exhaust valve rod 624. The exhaust valve rod 624 is terminated at its distal end, remote from the piston 622, by a tip 626. The upper portion of the valve rod 624 and the tip 626 extend into the exhaust cylinder 600 and into the stack 604. Movement of the piston rod 620 and the exhaust valve rod 624 covers and uncovers the exhaust ports 602 to allow exhaust gases to escape from the combustion chamber 610 and to seal the ports 602 during the compression stroke of the engine apparatus to seal the combustion chamber 610, all as discussed above in conjunction with engine apparatus 10 and 300.

Thus far, the engine apparatus 500 is substantially identical to the engine apparatus 10 and 300. However, the engine apparatus 500 departs from the engine apparatus 10 and 300 in the air intake system. Engine apparatus 500 includes an air intake conduit 640 which extends through the upper portion of the gear case 510. The air intake conduit 640 is, of course, appropriately secured to the gear case 510 and appropriately sealed therefrom.

A valve seat 534 extends downwardly into the cylinder plate 530. An aperture 536 extends downwardly from the valve seat 534 to communicate with the air intake conduit 640.

A poppet valve 650 is movable relative to the valve seat 534 to allow air from the conduit 640 into the lower portion of the inner cylinder 580 beneath the piston 622. The valve 650 includes a stem 652 which extends through the aperture 536 and through an aligned aperture 642 in the air intake conduit 640. The stem 652 extends downwardly into the interior of the gear case 510. The rod 652 is appropriately sealed in the aperture 642.

Secured to the stem 652 within the intake conduit 640 is a spring keeper 654. A compression spring 656 extends between the spring keeper 654 and the lower portion or bottom surface of the cylinder plate 530 about the aperture 536. The compression spring 656 urges the valve 650 in its down or closed position where it is disposed against its seat 534.

The upper surface of the journal hub 550 acts as a cam for actuating the valve 650 through the valve rod 652. Obviously, a particularly configured cam surface on the journal hub may be used to provide the necessary or desired open and closed times of the valve 650 in accordance with the desired degrees of rotation of the pinion gear assembly of the engine. The valve 650 is held open only at the top of the stroke to take advantage of the momentum of incoming air to maximize volumetric efficiency.

As the piston moves upwardly past transfer ports 582, a vacuum is created in the lower cylinder below the piston 622. Atmospheric pressure on the lower side of the poppet valve 650 causes the valve to open. Intake air then flows into the lower portion of the cylinder 580 below the piston 622.

Thus, rather than utilize a reed-type valve, as discussed above in conjunction with FIGS. 1A-5, for providing air into the cylinder assembly 560, the engine 500 utilizes the natural mechanical timing inherent in a two-stroke cycle, and a poppet valve actuated from within the gear case. The operation and various parts or elements typical of poppet valve systems are well known and understood in the art, and accordingly need not be discussed in detail.

SPRING BIASED EXHAUST VALVE EMBODIMENT

FIG. 7 is a view in partial section of a portion of engine apparatus 700. The engine apparatus 700 comprises another alternate embodiment of the apparatus of the present invention. Engine apparatus 700 includes a gear case 710, only a portion of which is illustrated in FIG. 7. The gear case, as shown, includes an end plate 712 and a pair of side plates 718 and 720. The end plate opposite to end plate 712 and the bottom plate are not shown.

The gear case 710 is closed by a top cylinder plate 730. An aperture 732 extends through the top cylinder plate 730.

A gear plate 740 is shown disposed in the gear case 710. The gear plate 740 includes an internal ring gear 742.

A pinion assembly 750, which is substantially identical to the pinion assemblies of the engine apparatus 10 and the engine apparatus 300 and the engine apparatus 500, is disposed within the gear case 710. The various elements of the pinion assembly 750 are substantially identical to those discussed above. Of the pinion assembly 750, a counterweight 756 is partially illustrated in FIG. 7. A portion of a rod bearing 760 is also shown in FIG. 7. An externally threaded boss 762 extends upwardly from the rod bearing 760.

A cylinder assembly 770 is appropriately secured to the top cylinder plate 730 of the gear case 710. The cylinder assembly 770 includes an outer cylinder 772, a middle cylinder 780, and an inner cylinder 790. The three cylinders are concentrically disposed with respect to each other and to the aperture 732 in the top cylinder plate 730.

The outer cylinder 772 includes an aperture 774 which receives a portion of the fuel injector 794. The outer cylinder 772 also includes an aperture 776 to which extends an intake air conduit 796.

The middle cylinder 780 includes a transfer slot 782 at the upper portion of the cylinder. The middle cylinder 780 also includes a fuel injector aperture 784. The injector aperture 784 is appropriately aligned with the injector aperture 774 in the outer cylinder 772. The fuel injector 794 is also shown extending through the aperture 784.

Aligned with the inner intake aperture 776 in the outer cylinder 772 is an aperture 786 in the middle cylinder 780. The air intake conduit 796 also is disposed within the aperture 786.

The inner cylinder 790 includes a plurality of transfer ports 792. The transfer ports 792 are generally aligned with the apertures 776 and 786 in the outer cylinders 772 and 780, respectively, and also with the apertures 774 and 784 through which the fuel injector 794 extends.

The cylinders 772, 780, and 790 are closed by a cylinder head 800. The cylinder head 800 includes a generally centrally located internally threaded aperture 802. The cylinder head 800 also includes a spark plug aperture 804. The aperture 804 is, of course, internally threaded also, and it receives a spark plug 806.

An exhaust stack 810 extends upwardly from the cylinder head 800. The exhaust stack 810 is externally threaded to matingly engage the internal threads of the aperture 802.

At the bottom of the exhaust stack 810 is a tapered valve seat 812.

A piston rod 820 is secured to the journal hub 760. The piston rod 820 includes an internal bore 822 and internal threads 824 at its lower end. The internal threads 824 matingly engage the external threads of the boss 762 to secure the piston rod 820 to the journal hub 760.

A piston 830 is appropriately secured to the upper end of the rod 820. At the upper portion of the piston rod 820 are internal threads 826. The piston 830 is secured to the rod 820 by a lower externally threaded boss 832. The lower threaded boss 832 includes a lower portion which is externally threaded to matingly engage the internal threads 826 of the piston rod 820.

An exhaust valve 850 is secured to the upper portion of a valve rod 852. The lower portion of the valve rod 852 extends through the bore 834 in the piston 830. At the lower end of the valve rod 852 and within the bore 822 and beneath the lower boss 832 is a valve keeper 854. The keeper 854 is secured to the end of the valve rod 852. A compression spring 856 is disposed within the bore 822 of the piston rod 820 between the top of the boss 762 and the valve keeper 854.

The bottom of the boss 832 acts as a stop for the keeper 854 and thus limits the upward movement of the valve stem 852 and the valve 850. The valve 850 extends into the valve seat 812 under the bias of the spring 856 as the piston rod 820, and its piston 830, move upwardly and downwardly. However, the valve rod 852 and the piston rod 820 are appropriately dimensioned so that the valve seat 812, and the exhaust stack 810, are open at the appropriate time to allow exhaust gases from a combustion chamber 840 to escape. The combustion chamber 840 is within the cylinder 790 between the piston 830 and the cylinder head 800.

The operation of the engine apparatus 700 is substantially the same as discussed above in conjunction with the engine apparatus 10, 300, and 500, with respect to the movement of the pinion assembly 750 and the piston rod 820 and its piston 830. Moreover, the air intake and fuel injection systems of the engine apparatus 700 are also substantially the same as discussed above in conjunction with engine apparatus 10 and 300.

The primary difference between engine apparatus 10 and engine apparatus 700 is in the exhaust system, and specifically in the exhaust valve 850 and its valve seat 812 in the exhaust stack 810. The valve rod 852 is freely movable in the bore 834 of the piston 830 and the boss 832 under the bias of the spring 856 and against the bias of the spring 856 as the valve 850 is seated on its seat 812 in the latter portion of the compression stroke and the first portion of the power and exhaust stroke.

At such time as the keeper 854 contacts the bottom of the fastener 832 in the downward movement of the piston rod 820, the valve 850 moves away from its seat 812, thus uncovering the exhaust stack 810. The exhaust stack 810 remains open to the combustion chamber 840 until the valve 850 contacts the valve seat 812 during the upward movement of the piston rod 820. During the completion of the upward movement and the beginning of the downward movement of the piston rod 820, the valve 850 remains seated, thus sealing the combustion chamber 840 from the exhaust stack 810.

EXHAUST VALVE ROD AND SEAL EMBODIMENT

FIG. 8 is a view in partial section of engine apparatus 900, which is another alternate embodiment of the apparatus of the present invention.

The engine apparatus 900 includes a gear case 910 in which is disposed the various gear elements, pinion assembly, etc., discussed above in conjunction with the other engine apparatus. The gear case includes, as shown in part; an end wall 912 and a top cylinder plate 914. The cylinder plate 914 includes an aperture 916 extending generally centrally through the plate 914. Within the gear case 910 is illustrated a portion of a gear plate 920 in which there is an internal ring gear, all as discussed above.

Since the details of the pinion assembly and the related elements have been discussed in detail in conjunction with the engine apparatus 10, and discussed in lesser detail in conjunction with the engine apparatus 300 and with the engine apparatus 500 and 700, further details are deemed unnecessary for the engine apparatus 900.

A cylinder assembly 930 is appropriately secured to the top plate 914. The cylinder assembly 930 is substantially identical to the cylinder assemblies discussed above in conjunction with engine apparatus 10, 300, 500, and 700. The cylinder assembly includes an outer cylinder 932, a middle cylinder 940, and an inner cylinder 950. The outer cylinder 932 includes a fuel injector aperture 934 and an air intake aperture 936. The middle cylinder 940 includes a rim 942 at the upper portion of the cylinder. The middle cylinder 940 also includes a fuel injector aperture 944 and an air intake aperture 946.

The inner cylinder 950 includes a plurality of transfer ports or apertures 952. A fuel injector 954 is shown extending through the fuel injector apertures 934 and 944 and into one of the transfer ports 952.

An air intake conduit 956 is shown secured to the outer cylinder 932 and extending through the apertures 936 and 946 in the outer and middle cylinders 932 and 940 respectively. The intake conduit 956 is appropriately aligned with one of the transfer ports 952 in the inner cylinder 950.

A cylinder head 960 is appropriately secured to the tops of the cylinders 932, and 950. The cylinder head 960 includes a centrally disposed internally threaded or tapped aperture 962. The cylinder head 960 also includes an internally threaded spark plug aperture 964. A spark plug 966 is shown secured to the cylinder head 960 in the spark plug aperture 964.

An exhaust stack 970 extends upwardly from the cylinder head 960. The exhaust stack 970 includes a tapered valve guide portion 972 at the bottom of the stack. The stack 970 also includes external threads 974 at the bottom or lower portion of the stack. The threads 974 extend into the internally threaded or tapped aperture 962 to secure the exhaust stack 970 to the cylinder head 960.

Within the exhaust stack 970 is an internal bore 976. Extending circumferentially about the bore 976 is a groove 978. A seal 980 is disposed in the circumferentially extending groove 978.

A piston rod 990 is shown extending upwardly through an appropriate seal in the aperture 916 in the top plate 914. The piston rod 990 includes an internal bore 992. The piston rod 990 terminates in a top 994. Extending axially downwardly from the top 994 within the bore 992 is an internally threaded portion 996.

A piston 1000 is secured to the top portion of the piston rod 990. The piston 1000 includes a bore extending through it, and there is a bottom counterbore extending upwardly from the bottom of the piston. Extending between the bore and the counterbore is a radially extending shoulder 1002. The top 994 of the piston rod 990 is disposed within the counterbore and against the shoulder 1002.

The piston 1000 also includes a dish-shaped depression 1004 on the top of the piston.

Extending upwardly from, and appropriately secured to the piston rod 990 and to the piston 1000, is an exhaust valve rod 1010. The exhaust valve rod 1010 includes an externally threaded bottom portion 1012 which matingly engages the internally threaded portion 996 of the piston rod 990. Extending outwardly from the lower portion of the exhaust valve rod 1010 is a flange 1014. The flange 1014 is disposed on the depression 1004 of the piston 1000.

When the threads 1012 of the exhaust valve rod 1010 engage the internal threads 996 of the piston rod 990, the piston 1000 is held securely to the top of the piston rod 990 and the three elements, the rod 990, the piston 1000, and the exhaust valve rod 1010 are secured together. If desired, the three elements may be made as a one piece element.

At the top of the exhaust valve rod 1010 is a tapered tip 1016.

In operation, the exhaust valve rod 1010 moves with the piston rod 990 and with the piston 1000. The exhaust valve rod 1010 extends into the bore 976 of the exhaust stack 970.

The external diameter of the exhaust valve 1010 is substantially the same as the internal diameter of the bore 976. Accordingly, as the tip 1016 extends through the guide portion 972, and into the bore 976, the exhaust valve rod 1010 acts as a valve to seal the bore 976. This occurs after the tip 1016 passes the seal 980 in the groove 978. At such time, a combustion chamber 1020 is effectively sealed from the exhaust stack 970. The combustion chamber 1020 extends within the inner cylinder 950 between the cylinder head 960 and the piston 1000.

In operation, the engine apparatus 900 operates in substantially the same manner as discussed above for the other embodiments as far as air intake, fuel injection, and compression is concerned. The primary difference is, of course, in the exhaust valve system.

The piston rod 990 moves linearly, and accordingly the exhaust valve rod 1010 also moves linearly. The length of the exhaust valve rod 1010 is appropriately dimensioned so as to seal the combustion chamber during compression and power portion of the strokes and so as to open the combustion chamber to the exhaust stack during the exhaust and transfer portion of the strokes.

EXTERNAL COMBUSTION EMBODIMENT

Figure 9:
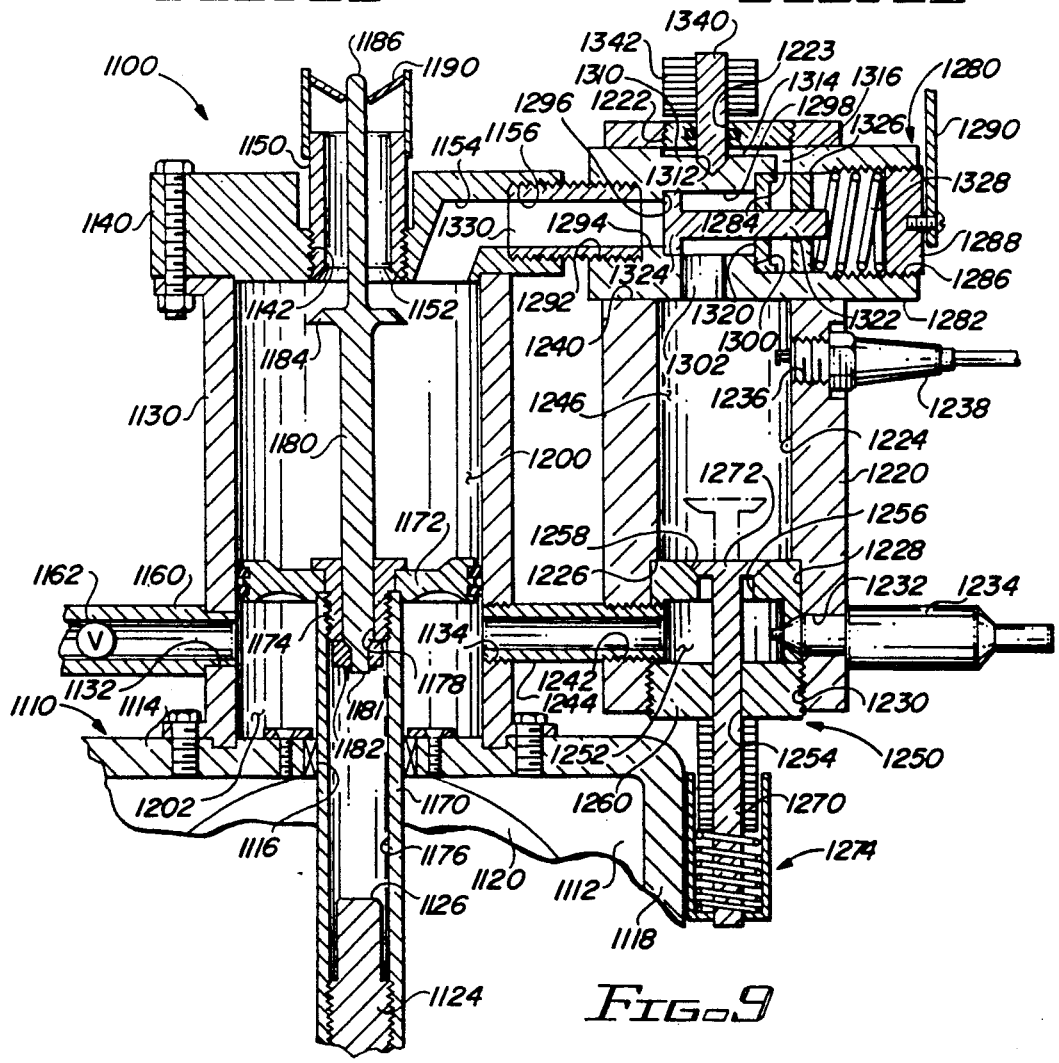
FIG. 9 is a view in partial section of a portion of another alternate embodiment of the apparatus of the present invention, comprising an external combustion apparatus.

FIG. 9 is a view in partial section of a portion of engine apparatus 1100. The engine apparatus 1100 comprises another alternate embodiment of the apparatus of the present invention.

The engine apparatus 1100 includes the same type of linear movement of the piston rod and piston assembly, but includes a constant volume extenal combustion chamber and thus differs from the engine apparatus discussed above. However, as indicated, the linear movement of the piston rod is substantially the same as discussed above. Moreover intake air flows into a cylinder beneath the piston and is compressed beneath the piston. The compressed air is then transferred to the constant volume combustion chamber. Fuel is injected into the compressed air as the air is being transferred. The charge of fuel and air flows into the combustion chamber for combustion.

Both the transfer of fuel and air into the combustion chamber and the transfer of the combustion gases into the working cylinder above the piston for the power and compression stroke are illustrated as using solenoid controlled valves.

The engine apparatus 1100 includes a gear case 1110, which is substantially identical to the gear cases discussed above in conjunction with the other engines. Only a portion of the gear case 1110 is illustrated. The gear case 1110, as shown in FIG. 9, includes an end plate 1112, a top plate 1114, and a side plate 1118.

It will be understood that a pinion gear assembly and the other elements discussed above in conjunction with the linear movement of the various piston rods of the other embodiments is substantially identical to the various elements within the gear case 1110. A portion of a gear plate 1120 is also illustrated in FIG. 9. The gear plate 1120 is appropriately secured within the gear case 1110. The gear plate 1120 includes an internal ring gear, not shown, in which the pinion assembly, also not shown, moves.

Within the gear case 1110, and appropriately secured to a journal hub, is a rod bearing, neither of which are shown. The rod bearing includes an externally threaded boss 1124. The boss 1124 includes a top cam portion 1126. The cam portion 1126 will be discussed in more detail below.

A cylinder 1130 is appropriately secured to the top plate 1114, also as discussed above in conjunction with the corresponding elements of the other embodiments. The cylinder 1130 includes an intake port 1132 to which an intake conduit 1160 is secured. The cylinder 1130 also includes an internally threaded aperture 1134 at the lower portion of the cylinder 1130, above the plate 1114. The intake port 1132 is aligned approximately or generally vertically with the aperture 1134.

A cylinder head 1140 closes the top of the cylinder 1130. The cylinder head 1140 includes an internally threaded aperture 1142 which is generally centrally located, and thus generally coaxially with the cylinder 1130. An exhaust stack 1150 is secured to the cylinder head 1140 through the internally threaded aperture 1142.

Exhaust stack 1150 includes a valve seat 1152 at its lower end. The valve seat 1152 is conically tapered inwardly to cooperate with an exhaust valve, as discussed below.

The cylinder head 1140 also includes a conduit 1154. The conduit 1154 includes an internally threaded portion 1156. The conduit 1154 extends from the internally threaded portion 1156 radially inwardly and downwardly to communicate with the interior of the cylinder 1130, as will be discussed in more detail below.

The air intake conduit 1160 is appropriately secured to the intake port 1132 of the cylinder 1130. An intake valve 1162 is disposed in the air intake conduit 1160 to control the one way flow of intake air through the conduit 1160 and into the cylinder 1130 through the intake port 1132. The valve 1162 may be a reed valve or a poppet valve, as desired.

A piston rod 1170 extends through the aperture 1116 and through appropriate seals secured therein. The piston rod 1170 is appropriately secured to the boss 1124 of a rod bearing associated with the pinion assembly referred to above, but not shown. The piston rod 1170 moves linearly with respect to the gear case 1110 and to the cylinder 1130.

The piston rod 1170 is appropriately secured to a piston 1172. The piston 1172 includes a nut 1174 which extends through the piston and which is coaxially aligned with a central bore 1176 within the piston rod 1170. The upper portion of the central bore 1176 is internally threaded to receive external threads of the nut 1174.

An exhaust valve rod 1180 extends through the a bore 1178 in the nut 1174 and is movable therein. The exhaust valve rod 1180 includes a bottom 1181, and there is a stop element 1182 adjacent to the bottom 1181. A valve 1184 is disposed on the upper portion of the rod 1180. The valve 1184 matingly engages the valve seat 1152 of the exhaust stack 1150.

Extending upwardly from the center of the valve 1184 is a guide tip 1186. An over-center spring assembly 1190 is secured to both the guide tip 1186 and the exhaust stack 1150. The operation of the valve rod 1180, and accordingly of the valve 1184 and of the over-center spring assembly 1190 will be discussed in more detail below.

Within the cylinder 1130, and between the piston 1172 and the cylinder head 1140 is a chamber 1200. Below the piston 1172 and above the cylinder plate 1114 is a chamber 1202. The significance and function of the chambers 1200 and 1202 will be discussed in more detail below.

An external combustion cylinder 1220 is disposed adjacent to the intake and compression cylinder 1130. The external combustion cylinder 1220 includes a top cap 1222. The top cap 1222 is threadedly secured to the cylinder 1220. Within the cylinder 1220, and below the top plug 1222, is a cylinder bore 1224. Extending downwardly from the cylinder bore 1224 is a bottom counterbore 1228. The diameter of the counterbore 1228 is slightly larger than the diameter of the cylinder bore 1224. A shoulder 1226 is disposed between the bore 1224 and the counterbore 1228. At the bottom of the counterbore 1228 is a threaded aperture 1230.

Extending through the wall of the cylinder 1220 at the counterbore 1228 is a fuel injector port 1232. A fuel injector 1234 is disposed in the port 1232. At the upper portion of the bore 1224 is a spark plug aperture 1236. A spark plug 1238 is disposed in the aperture 1236.

Extending diametrically across the upper portion of the cylinder 1220 and adjacent to the top 1222 is an exhaust valve assembly bore 1240. In the lower portion of the cylinder 1220, below the bore 1224, there is an internally threaded transfer bore 1242. The bore 1242 is disposed at the lower portion of the counterbore 1228, generally opposite the fuel injector bore 1232. A transfer conduit 1244 is disposed in the transfer bore 1242 and is secured in the internally threaded aperture 1134 of the cylinder 1130. The transfer bore 1242 is in actuality an internally threaded aperture aligned with the aperture 1134. The transfer conduit 1244 provides communication between the chamber 1202 and an intake chamber 1252 of an intake valve housing 1250. The intake valve housing 1250 is disposed at the lower portion of the cylinder 1220 and within the counterbore 1228, including the threaded portion 1230 of the counterbore 1228. The upper portion of the intake valve housing 1250 is disposed against the shoulder 1226 between the bore 1224 and the counterbore 1228.

The intake valve housing 1250 includes an upper valve seat 1258, a lower threaded valve guide portion 1260, and a central portion with bores for the fuel injector 1234 and the transfer conduit 1244.

A bore 1254 extends coaxially through the lower valve guide portion 1260 of the intake valve housing 1250. At the upper portion of the intake valve housing 1250 there is a bore 1256 which provides communication between the chamber 1252 and the combustion chamber 1246 above the intake valve housing 1250 within the bore 1224. A conically outwardly tapering portion 1258 of the bore 1256 defines a valve seat for a transfer valve 1272.

The transfer valve 1272 is connected to a valve rod or stem 1270 which extends through the bore 1254 at the lower end of the intake valve housing 1250. The valve rod or stem 1270 extends into a solenoid 1274 which is actuated to move the valve 1272, and its valve rod or stem 1270, to provide communication through the bore 1256 between the intake chamber 1252 and the combustion chamber 1246.

A pressure transfer assembly 1280 extends into the bore 1240. The pressure transfer assembly 1280 includes a cylinder 1282 having an internal bore 1284. The bore 1284 includes an internally threaded portion 1286 at its outer end. An adjustable plug 1288 is disposed in the threaded portion 1286. The plug 1288 is adjusted in the threaded portion 1286 by means of an adjusting arm 1290.

At the opposite end of the pressure transfer cylinder 1282 from the bore 1284 is an internally threaded exit bore 1292. The exit bore 1292 is aligned with the transfer bore 1156 in the cylinder head 1140.

Adjacent to the internally threaded exit bore 1292 is a counterbore 1294. A shoulder 1296 extends between the counterbore 1294 and a connecting bore 1298. The connecting bore 1298 extends between the counterbore 1294 and the bore 1284. A shoulder 1300 extends radially between the bore 1298 and the bore 1284.

A radially extending bore 1302 extends outwardly from the bore 1298 to communicate with the chamber 1246 and the bore 1224 of the cylinder 1220.

A groove 1310 extends circumferentially about the outer portion of the pressure transfer assembly cylinder 1282 and communicates with the bore 1224 and the combustion chamber 1246. A radially extending valve bore 1312 extends through the cylinder 1282 to provide communication between the circumferentially extending groove 1310 and an axially extending groove 1314. The bore 1312 is aligned with a bore 1223 which extends through the plug 1222. The axially extending groove 1314 extends from the radial bore 1312 to a second radial bore 1316. The radial bore 1316 extends radially inwardly to provide communication between the axially extending groove 1314 and the bore 1284.

An end wall element 1320 is disposed against the shoulder 1300 in the bore 1284. The end wall element 1320 is held in place by appropriate elements, not shown, or it may be press fitted in place, as desired. The end wall element 1320 includes a bore or aperture through which a valve stem or rod 1322 extends. The valve stem or rod 1322 extends between a valve 1324, which is disposed against the shoulder 1296 and is movable in the bore 1298, and an actuating piston 1326. The actuating piston 1326 is appropriately secured to the outer end of the valve stem or rod 1322, remote from the valve 1324.

A compression spring 1328 extends between the piston 1326 and the adjustable plug 1288. The compression spring 1328 biases the piston 1326, and in turn the rod 1322 and the valve 1324 which are connected together, against the shoulder 1296. This closes the bore 1294 to the bore 1298. This in turn prevents communication between the combustion chamber 1246 and a transfer conduit or tube 1330.

The transfer conduit 1330 provides communication between the chamber 1200 and the chamber 1246 through the bores 1302, 1298, and 1294 when the valve element 1324 is moved away from the shoulder 1296 in the bore 1298.

A valve element 1340 is disposed in the aligned bores 1223 and 1312. The valve element 1340 is movable in response to the actuation of a solenoid 1342.

As illustrated in FIG. 9, the piston 1172 is at its lowermost position. Its upward movement is a combination of ejecting spent gases and drawing inwardly air to be compressed or defining the exhaust and intake stroke.

As the piston 1172 moves upwardly, the exhaust gases within the chamber 1200 move outwardly through the exhaust stack 1150. The valve 1184 is off its seat, as illustrated in FIG. 9, providing communication between the chamber 1200 and the exhaust stack 1150. The exhaust gases move out of the chamber 1200 because the valve 1324 is seated against the shoulder 1296 to close off the bore 1294, the transfer tube 1330, and the bore 1154.

The upwardly moving piston 1172 causes air to be drawn into the chamber 1202 beneath the piston 1172 through the intake conduit 1160. The incoming air flows through the intake conduit 1160 and through the opened intake valve 1162.

As the piston 1172 moves upwardly, the valve stem 1180 moves through the bore 1178 in the nut 1174 of the piston 1172, and in the bore 1176 of the rod 1170. The valve 1184 accordingly remains open. As the piston 1172 approaches its top or uppermost position, the top cam surface 1126 of the externally threaded rod bearing boss 1124 contacts the bottom 1181 of the valve rod 1180. The boss 1124, and particularly its cam portion 1126, thus causes the rod 1180 to move upwardly to overcome the spring force of the spring 1190 which holds the valve open. As the valve rod 1180 moves upwardly, the overcenter feature of the spring 1190, once it is moved past its center point, causes the valve 1184 to be moved against the valve seat 1152, closing the exhaust stack 1150 from the chamber 1200.

When the piston 1172 reaches its top dead center position, the solenoid 1342 is actuated to cause the valve element 1340 to move upwardly. The gases from combustion within the chamber 1246, flowing in the annular or circumferentially extending groove 1310, move through the bore 1312 upon the withdrawal of the valve 1340 by the actuation of the solenoid 1342. The combustion gases then flow into the axially extending groove 1314, and through the radial groove 1316 into the bore 1284. The hot gases then exert a pressure against the piston 1326 to cause the piston 1326 and the rod 1322 to move against the bias of the spring 1328.

The movement of the piston 1326 causes the valve 1324, secured to the rod 1322, to move away from the shoulder 1296. Once the valve 1324 is away from the shoulder 1296 and into the bore 1298, the combustion gases move from the chamber 1246 and the bore 1302 into the bores 1298 and 1294 and into the transfer conduit 1330 and into the chamber 1200. The combustion gases then cause the piston 1172 to move downwardly.

The valve 1324 is held open by the pressure of the gases against both the piston 1326 and the valve 1324. The combustion gases thus move from the combustion chamber 1246 into the operating chamber 1200 above the piston 1172. The piston 1172 then moves downwardly on its power and compression stroke.

The valve 1184 remains closed due to the pressure of the hot combustion gases and the bias of the over center spring 1190 during the downward movement of the piston 1172. The valve 1184 thus closes the exhaust stack 1150 to prevent exhaust gases from flowing outwardly until the piston 1172 approaches the end of its stroke. As the piston 1172 approaches the end of its stroke, the bottom of the piston nut 1174 within the bore 1176 of the piston rod 1170 contacts the stop element or keeper 1182 at the bottom of the valve rod 1180, and causes the valve rod 1180 to be moved downwardly, against the initial bias of the over center spring 1190. When the spring 1190 moves past its center point, and under the continued force of the piston against the element 1182 of the rod 1180, the valve 1184 is moved away from its seat 1152, thus opening the chamber 1200 to the exhaust stack 1150.

The opening of the exhaust valve 1184 releases pressure in the chambers 1200 and 1246, and their intermediate bores, etc. The release of pressure allows the compression spring 1328 to close the valve 1324. The solenoid 1342 is then turned off, thus closing the axial groove 1314, and the bore 1316, and the bore 1284 to the gases from the chamber 1246 and the groove 1310. The valve 1324 then closes under the bias of the spring 1328, as discussed above. The combustion chamber 1246 is then sealed, along with the bore 1302 and the bore 1298 from the transfer conduit 1330, the bore 1154, and the working chamber 1200. The exhaust gases within the chamber 1200 are then expelled as the piston 1172 moves upwardly. With the exhaust valve 1184 open, as discussed above, the exhaust gases in the chamber 1200 flow out of the exhaust stack 1150.

The downward movement of the piston 1172 compresses the air in the chamber 1202 beneath the piston 1172 and above the plate 1114. The intake valve 1162 in the intake conduit 1160 closes to prevent the intake air from flowing backwardly or outwardly to the intake conduit 1160. The piston 1172 compresses the air beneath it and in the chamber 1202, the conduit 1244, and the chamber 1252.

As the piston 1172 approaches bottom on its power and compression stroke, the solenoid 1274 is actuated to move the valve stem 1270 and the valve 1272 upwardly away from the seat 1258. When the valve 1272 opens as the solenoid 1274 is actuated, the fuel injector 1234 is opened to inject fuel into the chamber 1252 and into the compressed air as the air moves from the chamber 1252 upwardly through the bore 1256 and into the combustion chamber 1246. When the piston reaches its full down or bottom dead center position, the solenoid 1274 is turned off to close the valve 1272 and the bore 1256 between the chambers 1252 and 1246. At such time, the combustion chamber 1246 is fully charged with its compressed air and fuel. The spark plug 1238 then fires to cause combustion to take place within the combustion chamber 1246.

The hot gases from the combustion process flow from the constant volume combustion chamber 1246 to the chamber 1200 above the piston 1172. The chamber 1200 is the only chamber in which there is a piston, and accordingly in which the volume changes.

At the same time as the piston 1172 begins to move upwardly, the spark plug 1238 is fired to cause combustion to take place in the combustion chamber 1246. Prior to the firing of the spark plug 1238, the solenoid 1274 is turned off, and the valve 1272 moves to its seat 1258 to seal the combustion chamber 1246 from the chamber 1252. The chamber 1246 is thus sealed at both its upper portion and its lower portion, and combustion can then take place. As the spark plug 1238 fires, the combustion takes place within the external combustion chamber 1246.

While combustion is taking place, the piston 1172 is moving upwardly to cause the exhaust gases in the chmaber 1200 to flow out of the chamber 1200 and into the exhaust stack 1150, as discussed above. And, as also discussed above, the upwardly moving piston causes a fresh charge of air to be drawn into the chamber 1202 beneath the piston 1172.

The valve 1184 remains open during substantially the entire exhaust and intake stroke or movement of the piston 1172. During this movement, the valves 1272, 1324, and 1340 remain closed. As the piston 1172 approaches its top dead center position, the exhaust valve 1184 closes to seal the chamber 1200, as discussed above. The solenoid 1342 is actuated at about the same time and the valve element 1340 opens the bore 1312 to the annular groove 1310 to allow the hot combustion gases from the chamber 1246 to move against the piston 1326 to withdraw the valve 1324 from its seat, which comprises the shoulder 1296. As the valve 1324 moves into the bore 1298 and allows communication from the chamber 1246 through the bores 1302 and 1298 and into the transfer conduit 1330, the combustion gases move out of the combustion chamber 1246 and into the chamber 1200 on top of the piston 1172.

Again, as the piston 1172 moves downwardly, compression of the fresh charge of air in the chamber 1202, the transfer conduit 1244, and the chamber 1252 occurs. From the chamber 1252, the valve 1272 opens when its solenoid 1274 is actuated and the fuel injector 1234 is also actuated to inject fuel into the compressed air flowing from the chamber 1252 through the bore 1256 and into the chamber 1246. The cycle thus continues to repeat.

It will be noted that there is substantially no valve overlap, the various valves are open during virtually the entire stroke time of the piston between the top dead center and bottom dead center positions to provide for the substantially complete exhaustion of the exhaust gases. As the piston moves downwardly, there is the substantially complete entry of a fresh charge of air and the compression of the air and the fuel. The compressed fuel and air charge is then transferred into the combustion chamber.

The exhaust valve opens and remains open until closed by positive action. The exhaust valve then closes and remains closed until there is a positive opening. The positive opening and closing of the exhaust valve is occassioned by the combination of the over center spring system 1190 and the movement of the piston 1172 and its associated elements, including the boss 1124 and the cam surface 1126 thereof. The valve 1272 and the valve 1324 open and close in accordance with predetermined timing parameters to allow for the intake of air into the combustion chamber 1246 and to allow for the evacuation from the combustion chamber 1246 of the combustion gases after combustion has taken place.

Since there is no overlap of strokes, it will be noted that there is substantially a full or complete exhaust and intake stroke, and a substantially complete or full compression or power stroke. While power is transmitted to the piston on every downstroke of the piston as in a two-stroke cycle engine, a full piston stroke is devoted to each of the functions of compression, power, exhaust, and intake, as in a conventional four-stroke cycle engine. At the same time, due to the linear movement of the piston rod 1170, the advantages of the system, as discussed above, in conjunction with the other embodiments, are maintained in the engine apparatus 1100.

If desired, the solenoids 1274 and 1342 could be replaced by cam mechanisms (not shown) working in conjunction with the output or the timing shafts. The timing and operation of mechanical valves is simplified by the two-stroke operating cycle.

CONCLUSION

The apparatus discussed above includes several embodiments of a two-stroke cycle internal combustion engine. A common feature is the use of hypocycloid gearing to produce straight line, balanced motion of a piston rod and related elements. Another common feature is a sealed crankcase, sealed from the working cylinder in which a piston moves.

There are other common features of the various embodiments also, such as an exhaust valve rod secured to and movable with the piston. The flow of exhaust gases is upwardly and out through the cylinder head. This features is common to all embodiments, although different valve rod elements, such as the valve rods themselves, valve seats, exhaust port structures, and the like, are shown.

The sealed crankcase eliminates the need for mixing oil with fuel. Fuel is injected at the bottom of the combustion chamber, just above the piston at its lowermost position. This insures that only air is used to scavenge the exhaust gases. Moreover, the sealed crankcase allows piston blow-by to be recirculated to the combustion chamber.

Multiple concentric cylinder embodiments are included, with an air transfer plenum disposed between cylinders. This arrangement provides for the preheating of the air prior to its introduction above the piston at the beginning of the exhaust-transfer portion of the stroke.

A chamber beneath the piston, but above the sealed crankcase, receives a fresh charge of air for initial compression and preheating. With a transfer plenum between concentric cylinders, the intake air is preheated during the power stroke, which is also an initial compression stroke for the intake air. There is no diminishing of the volumetric efficiency while the preheating is taking place.

The use of concentric cylinders for the preheating of intake air also has a beneficial effect on the cylinder cooling. That is, the inner cylinder is cooled by the air flow and there is minimal heating of the crankcase. This allows increased combustion temperatures without adversely affecting the crankcase and the gearing therein and also diminishes the need for external cooling.

The arrangement of transfer ports and an exhaust stack provides for the unidirectional flow of both intake air and exhaust gases. With the cylinder arrangement and the exhaust stack arrangement, it is also possible to substantially increase the areas for intake, exhaust, and transfer. Moreover, pumping losses are reduced and there is improved breathing and volumetric efficiency with the intake and exhaust port arrangement. The exhaust gases are scavenged with transfer air prior to the introduction of fuel, and this helps to eliminate loss of fuel through exhaust ports and helps to reduce fuel condensation. This feature is also common to all embodiments.

The employment of a restrictor or controller valve in the exhaust stack provides an improved volumetric efficiency over the prior art at all operating speeds since the flow of exhaust gases may be matched to the inflow of air into the combustion chamber.

In the external combustion embodiment, there is a true constant volume combustion process and a corresponding increase in work potential as compared with the prior art. With full length intake, power, and exhaust strokes, there is a significant increase in the time available for the combustion process as compared with the prior art. Moreover, there is an improved utilization of heat approaching adiabatic operation.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What is claim is:

1. Two-stroke cycle engine apparatus having linear piston rod movement and hypocycloid gearing connecting the piston rod and an output shaft, comprising, in combination:
   gearcase means, including
      a housing in which the hypocycloid gearing is disposed, having a top wall, and
      a piston rod connected to the hypocycloid gearing and extending through the top wall;
   cylinder means secured to the gearcase means, including
      an inner cylinder,
      a piston movable in the inner cylinder and connected to the piston rod for providing compression within the inner cylinder in response to movement of the piston rod,
      an exhaust valve rod secured to the piston and movable therewith;
   cylinder head means secured to the cylinder means, including
      a cylinder head adjacent to the inner cylinder,
      an exhaust cylinder for receiving the exhaust valve rod,
      an exhaust port extending through the exhaust cylinder through which exhaust gases flow, and movement of the exhaust valve rod opens and closes the port in response to movement of the piston, and
      an exhaust stack communicating with the exhaust cylinder for receiving exhaust gases from the exhaust cylinder;
   means for providing fuel and air into the cylinder means; and
   means for combusting the fuel and air in the inner cylinder.

2. The apparatus of claim 1 in which the cylinder means further includes
   a middle cylinder,
   an outer cylinder spaced apart from the middle cylinder, and
   means for transferring air compressed by the piston in the inner cylinder to the middle cylinder and the outer cylinder and from the outer and middle cylinders to the inner cylinder.

3. The apparatus of claim 2 in which the means for transferring air includes a plurality of transfer slots extending through the inner cylinder.

4. The apparatus of claim 2 in which the cylinder means further includes a plurality of alternating flutes and ribs on the inner cylinder and air flows into the flutes as the air is transferred.

5. The apparatus of claim 4 in which the middle cylinder is disposed against the ribs of the inner cylinder for transferring heat from the inner cylinder to the middle cylinder.

6. The apparatus of claim 2 in which the middle cylinder includes a top rim spaced apart from the cylinder head, and the air transferred between the middle cylinder and the outer cylinder flows between the top rim and the cylinder head.

7. The apparatus of claim 1 in which the gearcase means includes means for sealing the piston rod in the top wall for preventing exhaust gases in the form of piston blow-by from flowing into the housing.

8. The apparatus of claim 1 in which the cylinder means includes a plurality of inner cylinders, each of which includes a piston movable therein;
   the gearcase means includes a plurality of piston rods connected to the hypocycloid gearing, with each piston rod extending to one of the plurality of cylinders and connected to the piston movable therein;
   the cylinder head means includes a plurality of cylinder heads, each of which is secured to an inner cylinder;
   the means for providing fuel and air into the cylinder means includes means for providing fuel and air for each inner cylinder; and the means for combusting the fuel and air includes means for combusting the fuel and air in each inner cylinder.

9. The apparatus of claim 1 in which the means for providing fuel and air into the cylinder means includes an intake conduit and valve means for controlling a flow of air through the intake conduit.

10. The apparatus of claim 9 in which the valve means comprises a reed valve controlled by differential pressure between the inner cylinder and the intake conduit on opposite sides of the reed valve.

11. The apparatus of claim 9 in which the valve means comprises a poppet valve controlled by movement of the hypocycloid gearing in the gear case means.

12. The apparatus of claim 1 in which the means for providing fuel and air includes means for providing a flow of air into the inner cylinder beneath the piston for compression by movement of the piston.

13. The apparatus of claim 12 in which the cylinder means further includes a middle cylinder and an outer cylinder spaced apart from the middle cylinder, and the space between the outer cylinder and the middle cylinder communicates with the inner cylinder and comprises a transfer plenum for receiving air compressed in the inner cylinder beneath the piston.

14. The apparatus of claim 13 in which the inner cylinder of the cylinder means includes a plurality of flutes and ridges, and the middle cylinder contacts the ridges of the inner cylinder, and the flutes communicate with the space between the outer cylinder annd middle cylinder for receiving and transferring the compressed air and the flutes comprise a continuation of the transfer plenum.

15. Two-stroke cycle engine apparatus having linear piston rod movement and hypocycloid gearing connecting the piston rod and an output shaft, comprising, in combination:
gearcase means, including
a housing in which the hypocycloid gearing is disposed, having a top wall, and
a piston rod connected to the hypocycloid gearing and extending through the top wall;
cylinder means secured to the gearcase means, including
a first cylinder,
a piston movable in the first cylinder and connected to the piston rod for providing compression within the first cylinder in response to movement of the piston rod, and
exhaust valve rod means secured to the piston and movable therewith;
cylinder head means secured to the cylinder means, including
a cylinder head secured to the first cylinder, and
exhaust stack means secured to the cylinder head for receiving the exhaust valve rod means and for receiving exhaust gases from the inner cylinder, and movement of the exhaust valve rod means opens and closes the exhaust stack means in response to movement of the piston;
means for providing fuel and air into the cylinder means; and
means for combusting the fuel and air.

16. The apparatus of claim 15 in which the exhaust valve rod means includes an exhaust valve, and the exhaust stack means includes a valve seat for receiving the exhaust valve.

17. The apparatus of claim 16 in which the exhaust valve rod means further includes a valve rod movable relative to the piston and to the piston rod.

18. The apparatus of claim 17 in which the exhaust valve rod means includes a compression spring for urging the valve rod and the exhaust valve against the valve seat.

19. The apparatus of claim 17 in which the exhaust stack means further includes spring means secured to the valve rod for urging the exhaust valve against the valve seat.

20. The apparatus of claim 17 which includes spring means for urging the exhaust valve against the valve seat.

21. The apparatus of claim 15 in which the cylinder means further includes
a second cylinder concentrically disposed about the first cylinder, and
a third cylinder concentrically disposed about the second cylinder, and the fuel and air is provided in the first cylinder and the combusting of the fuel and air takes place in the first cylinder.

22. The apparatus of claim 21 in which the cylinder means further includes means for transferring air compressed by the piston in the first cylinder to the second and third cylinders.

23. The apparatus of claim 22 in which the first cylinder of the cylinder means includes a plurality of alternating flutes and ribs, and air flows into the flutes as the air is transferred.

24. The apparatus of claim 23 in which the second cylinder is disposed against the ribs of the first cylinder.

25. The apparatus of claim 15 in which the cylinder means further includes a second cylinder disposed adjacent to the first cylinder, and the combusting of the fuel and air takes place in the second cylinder.

26. The apparatus of claim 25 in which the means for providing fuel and air includes means for providing a flow of air into the first cylinder beneath the piston for compression and means for transferring the compressed air from the first cylinder to the second cylinder.

27. The apparatus of claim 26 in which the means for providing fuel and air further includes means for providing fuel to the compressed air in the second cylinder.

28. The apparatus of claim 27 in which the second cylinder includes a first portion and a second portion, and the charge of air is transferred from the first portion to the second portion for combustion.

29. The apparatus of claim 28 in which combustion gases from the combusting of the fuel and air in the second portion of the second cylinder are transferred to the first cylinder.

30. The apparatus of claim 29 in which the combustion gases are transferred into the first cylinder above the piston and the air flows into the first cylinder below the piston and is compressed by movement of the piston in response to the transfer of the combustion gases above the piston.

31. Two-stroke cycle engine apparatus having linear piston rod movement and hypocycloid gearing connecting the piston rod and an output shaft, comprising, in combination:
gearcase means, including
a housing in which the hypocycloid gearing is disposed, having a top wall, and
a piston rod connected to the hypocycloid gearing and extending through the top wall;
a cylinder secured to the gearcase means;

a piston movable in the cylinder and connected to the piston rod for providing compression within the cylinder in response to movement of the piston rod;

exhaust valve rod means secured to the piston and movable therewith;

a cylinder head secured to the cylinder;

exhaust stack means secured to the cylinder head for receiving the exhaust valve rod means and for receiving exhaust gases from the cylinder, and movement of the exhaust valve rod means controls the flow of exhaust gases through the exhaust stack means in response to movement of the piston;

means for providing fuel and air into the cylinder means; and means for combusting the fuel and air.

32. The apparatus of claim 31 in which the exhaust valve rod means includes an exhaust valve, and the exhaust stack means includes a valve seat for receiving the exhaust valve.

33. The apparatus of claim 31 in which the exhaust valve rod means includes a valve rod movable relative to the piston and to the piston rod.

34. The apparatus of claim 31 in which the exhaust stack means includes a bore for receiving the exhaust valve rod means.

35. The apparatus of claim 34 in which the exhaust stack means further includes means for sealing the exhaust valve rod means.

36. The apparatus of claim 31 in which the exhaust stack means includes a valve for restricting the flow of exhaust gases in response to the flow of air into the cylinder.

* * * * *